United States Patent
Monat et al.

(10) Patent No.: US 8,103,228 B2
(45) Date of Patent: Jan. 24, 2012

(54) METHOD FOR DETERMINING LINE-OF-SIGHT (LOS) DISTANCE BETWEEN REMOTE COMMUNICATIONS DEVICES

(75) Inventors: Pavel Monat, San Diego, CA (US); David Jonathan Julian, San Diego, CA (US); Robert Keith Douglas, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1056 days.

(21) Appl. No.: 11/777,237

(22) Filed: Jul. 12, 2007

(65) Prior Publication Data
US 2009/0017782 A1 Jan. 15, 2009

(51) Int. Cl.
*H04B 7/00* (2006.01)
(52) U.S. Cl. .................... 455/130; 455/336
(58) Field of Classification Search ............ 455/41.1, 455/41.2, 63.1, 67.11, 91, 106, 130, 205, 455/324, 336; 342/42, 43, 44, 51
See application file for complete search history.

(56) References Cited

U.S. PATENT DOCUMENTS

| | | | |
|---|---|---|---|
| 5,201,060 A * | 4/1993 | Haruyama et al. | ............ 455/63.1 |
| 5,687,169 A | 11/1997 | Fullerton | |
| 5,764,696 A | 6/1998 | Barnes et al. | |
| 5,812,081 A | 9/1998 | Fullerton | |
| 5,832,035 A | 11/1998 | Fullerton | |
| 5,862,456 A * | 1/1999 | Bode et al. | ........................ 455/73 |
| 5,907,427 A | 5/1999 | Scalora et al. | |
| 5,952,956 A | 9/1999 | Fullerton | |
| 5,960,031 A | 9/1999 | Fullerton et al. | |
| 5,963,581 A | 10/1999 | Fullerton et al. | |
| 5,969,663 A | 10/1999 | Fullerton et al. | |
| 5,995,534 A | 11/1999 | Fullerton et al. | |
| 6,031,862 A | 2/2000 | Fullerton et al. | |
| 6,091,374 A | 7/2000 | Barnes | |
| 6,111,536 A | 8/2000 | Richards et al. | |

(Continued)

FOREIGN PATENT DOCUMENTS

CN 1853114 A 10/2006

(Continued)

OTHER PUBLICATIONS

Partial International Search Report, PCT/US2008/068743—International Searching Authority—European Patent Office—Sep. 19, 2008.

(Continued)

*Primary Examiner* — Thanh Le
(74) *Attorney, Agent, or Firm* — Dang M. Vo

(57) ABSTRACT

An apparatus for wireless communications is disclosed including a super regenerative receiver adapted to receive an incoming signal from a remote apparatus, and a circuit adapted to at least partially determine the distance to the remote apparatus based on the incoming signal. The super regenerative receiver may be configured for relatively high sensitivity to allow the distance measurement circuit to discern the line-of-sight (LOS) portion of the incoming signal from the non-LOS portion thereof. Using the time of the LOS portion of the incoming signal, the circuit is able to more accurately determine the distance to the remote apparatus. By sending a signal to the remote apparatus, and receiving a response signal from the remote apparatus, the circuit may determine the distance to the remote apparatus from the respective times of the transmission and reception of the signals.

46 Claims, 14 Drawing Sheets

U.S. PATENT DOCUMENTS

| | | | |
|---|---|---|---|
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Fullerton et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,614,384 B2 | 9/2003 | Hall et al. |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,845,253 B1 | 1/2005 | Schantz |
| 6,847,675 B2 | 1/2005 | Fullerton et al. |
| 6,879,878 B2 | 4/2005 | Glenn et al. |
| 6,882,301 B2 | 4/2005 | Fullerton |
| 6,895,034 B2 | 5/2005 | Nunally et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,963,727 B2 | 11/2005 | Shreve |
| 6,980,613 B2 | 12/2005 | Krivokapic |
| 6,989,751 B2 | 1/2006 | Richards |
| 7,015,793 B2 | 3/2006 | Gabig, Jr. et al. |
| 7,020,224 B2 | 3/2006 | Krivokapic |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,069,111 B2 | 6/2006 | Glenn et al. |
| 7,075,476 B2 | 7/2006 | Kim |
| 7,079,827 B2 | 7/2006 | Richards et al. |
| 7,099,367 B2 | 8/2006 | Richards et al. |
| 7,099,368 B2 | 8/2006 | Santhoff et al. |
| 7,129,886 B2 | 10/2006 | Hall et al. |
| 7,132,975 B2 | 11/2006 | Fullerton et al. |
| 7,145,954 B1 | 12/2006 | Pendergrass et al. |
| 7,148,791 B2 | 12/2006 | Grisham et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,184,938 B1 | 2/2007 | Lansford et al. |
| 7,190,722 B2 | 3/2007 | Lakkis et al. |
| 7,190,729 B2 | 3/2007 | Siwiak |
| 7,206,334 B2 | 4/2007 | Siwiak |
| 7,209,724 B2 | 4/2007 | Richards et al. |
| 7,230,980 B2 | 6/2007 | Langford et al. |
| 7,239,277 B2 | 7/2007 | Fullerton et al. |
| RE39,759 E | 8/2007 | Fullerton |
| 7,256,727 B2 | 8/2007 | Fullerton et al. |
| 7,271,779 B2 | 9/2007 | Hertel |
| 2005/0285781 A1 | 12/2005 | Park et al. |
| 2006/0262006 A1 | 11/2006 | Vavik |

FOREIGN PATENT DOCUMENTS

| | | |
|---|---|---|
| EP | 1830474 | 9/2007 |
| GB | 1373736 | 11/1974 |
| GB | 1598063 | 9/1981 |
| KR | 20060000783 A | 1/2006 |

OTHER PUBLICATIONS

European Search Report—EP08006304, Searching Authority—Munich Patent Office—Aug. 1, 2008.

International Search Report, PCT/US08/068743, International Searching Authority—European Patent office, Dec. 15, 2008.

Written Opinion—PCT/US/08/068743, International Searching Authority—European Patent Office, Dec. 15, 2008.

\* cited by examiner

METHOD FOR DETERMINING LINE-OF-SIGHT (LOS) DISTANCE BETWEEN REMOTE COMMUNICATIONS DEVICES

BACKGROUND

1. Field

This disclosure relates generally to communications systems, and in particular, to a system and method for determining an approximate line-of-sight (LOS) distance between remote communications devices.

2. Background

In many communications applications, the distance between two communicating remote communications devices may need to be determined. One reason to know this distance is for security purposes. For example, if the distance to a remote communications device exceeds a defined threshold, it may be determined that the remote device is not part of the network or not authorized to communicate with network devices. Thus, in such a case, the remote device is not allowed to communicate with the network devices. Yet, another reason for determining a distance between two remote communications devices is for people tracking purposes. For example, a parent may provide a child a communications device that communicates with a communications device carried by the parent. If the parent device determines that the distance to the child device is beyond a defined threshold, the parent device may alert the parent that the child has strayed beyond a safe distance. There could still be many other reasons for determining the distance between two remote communications devices.

One method used to determine the distance between two remote communications devices is for the first device to send a signal to the second device, and then for the second device to send the signal back to the first device. The first communication device may then calculate the distance to the second communication device by using the time t1 that it transmitted the signal to the second communication device and the time t2 it received the signal from the second communication device. The distance would be given by the following:

$$\text{Distance}=(t_2-t_1-t_{processing})*c/2 \qquad \text{Eq. 1}$$

where c is equal to the speed of light and $t_{processing}$ is the known processing delay which can be calibrated out. For ease of illustration, this disclosure assumes that the $t_{processing}$ is equal to zero, although it shall be understood that it could have a value greater than zero. One drawback with this distance measurement approach is that it is assumed that the signal received by the communications devices traveled in a straight line from one device to another device. This may not be the case, as explained below with reference to the following exemplary scenario.

FIG. 1A illustrates a diagram depicting exemplary multiple paths that a signal may take in propagating from one device to another device. In this example, a transceiver A 102 of a communication device is transmitting a signal to a transceiver B 106 of another communication device. Also, in this example, there may be multiple objects that may obstruct the signal while in transit from transceiver A 102 to transceiver B 106, such as obstructions 152, 154, and 156.

These obstructions may produce different signals paths from transceiver A 102 to transceiver B 106. For instance, a signal path 1 may follow a direct path from transceiver A 102 to transceiver B 106, passing through obstruction 154. The direct signal path between transceivers is generally referred to as the line-of-sight (LOS) path.

Another signal path 2 may take an indirect path from transceiver A 102 to transceiver B 106 by reflecting off of obstruction 152. Yet another signal path 3 may also take an indirect path from transceiver A 102 to transceiver B 106 by reflecting off of obstruction 156. These indirect signal paths between the transceiver are generally referred to as non-LOS paths. The signal received at the transceiver B 106 is a result of receiving the signal via the LOS path and via one or more non-LOS paths, as further explained below.

FIG. 1B illustrates graphs of an exemplary signal transmitted by transceiver A 102 and the corresponding signal power received by transceiver B 106 in a multipath scenario. As the graphs illustrate, the signal transmitted by transceiver A 102 has a defined waveform. In this example, the defined waveform is a full-period pulse as shown. Because of the signal takes multiple paths in arriving at transceiver B 106, the signal is received at different times because the LOS path is shorter than the non-LOS paths. Thus, the power of the original signal is spread over time at the receiving transceiver B 106 as shown. The received signal includes a portion 1 attributed to the LOS signal path 1, a portion 2 attributed to the non-LOS path 2, and a portion 3 attributed to the non-LOS path 3.

To determine the distance between the transceivers accurately, it is desirable to use the portion of the received signal attributed to the LOS path 1 since this path is the shortest and direct path between the transceivers. Using the non-LOS paths 2 and 3 would result in some errors since the paths are generally longer than the LOS path 1. However, in the past, discerning the LOS signal portion from the noise floor and from the non-LOS signal portions may have been difficult because an obstruction, such as obstruction 154, may have substantially attenuated the power level of the LOS signal portion. Thus, as shown in the example, the power level of the LOS signal portion is relatively small compared to the power level of the non-LOS portions 2 and 3.

Prior receivers that use non-coherent techniques for receiving the signal were not that effective in discerning the LOS signal portion from the non-LOS portions because the LOS signal portion would often be buried in the noise floor. Other prior receivers that use coherent techniques were better at discerning the LOS signal portion from the non-LOS signal portion, but would consume an undesirable high amount of power in accomplishing this task.

SUMMARY

An aspect of the disclosure relates to an apparatus for wireless communications comprising a super regenerative receiver adapted to receive an incoming signal from a remote apparatus, and a first circuit adapted to at least partially determine the distance to the remote apparatus based on the incoming signal. In another aspect, the super regenerative receiver may comprise one or more super regenerative amplifiers. In another aspect, the super regenerative receiver comprises a plurality of super regenerative amplifiers coupled in parallel, wherein the amplifiers are tuned to distinct frequency bands, respectively. In another aspect, the number of super regenerative amplifiers, the respective quality factors (Q) of the amplifiers, and the respective center frequencies (fc) of the distinct frequency bands are configured to provide a defined minimum gain, a defined gain ripple, or a defined frequency response across a defined bandwidth. In another aspect, one or more of the distinct frequency bands may overlap with at least another one or more of the distinct frequency bands.

In another aspect of the disclosure, the apparatus for wireless communications may further comprise a second circuit adapted to determine a substantially line-of-sight (LOS) portion of the incoming signal, wherein the first circuit is adapted to at least partially determine the distance to the remote apparatus from the substantially LOS portion of the incoming signal. In another aspect, the second circuit comprises a power detector adapted to generate a first response related to the power level of the incoming signal, a noise level detector adapted to generate a second response related to the power level of the ambient noise, and a comparator adapted to generate an output based on a comparison of the first response to the second response.

In other aspects of the disclosure, the incoming signal may comprise one or more pulses. The first circuit may be adapted to at least partially determine the distance to the remote apparatus based on the approximate time of receiving the incoming signal. Additionally, in another aspect, the apparatus for wireless communications may further comprise a transmitter adapted to transmit an outgoing signal to the remote apparatus, where the first circuit determines the distance to the remote apparatus based on the approximate time of transmitting the outgoing signal to the remote apparatus, and an approximate time of receiving the incoming signal from the remote apparatus.

In still another aspect of the disclosure, the apparatus for wireless communications may further comprise a transmitter adapted to transmit an outgoing signal to the remote apparatus, wherein the first circuit is adapted to partially determine the distance to the remote apparatus by causing the transmitter to transmit an outgoing signal in response to receiving and processing the incoming signal. In other aspects, the apparatus may further comprise a second circuit to determine whether a jamming signal is present at the output of the super regenerative receiver, and a third circuit to disable a portion of the super regenerative receive to reduce or eliminate the jamming signal from the output of the super regenerative receiver. In also another aspect, the super regenerative receiver is tuned to receive the incoming signal within a defined ultra-wide band channel that has a fractional bandwidth on the order of 20% or more, a bandwidth on the order of 500 MHz or more, or a fractional bandwidth on the order of 20% or more and a bandwidth on the order of 500 MHz or more.

Other aspects, advantages and novel features of the present disclosure will become apparent from the following detailed description of the disclosure when considered in conjunction with the accompanying drawings.

DETAILED DESCRIPTION

Various aspects of the disclosure are described below. It should be apparent that the teachings herein may be embodied in a wide variety of forms and that any specific structure, function, or both being disclosed herein are merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As an example of some of the above concepts, in some aspects, the apparatus may comprise a super regenerative receiver adapted to receive an incoming signal from a remote apparatus, and a circuit adapted to at least partially determine a distance to the remote apparatus based on the incoming signal. The super regenerative receiver and the distance determination circuit may be configured as one or more integrated circuits, as one or more discrete components, or a combination of one or more integrated circuits and one or more discrete components. The super regenerative receiver and the distance determination circuit may include a processor or other programmable device for achieving their respective functionality as described herein. Such processor or programmable device may be operated with the use of executable codes.

Figure 1A:
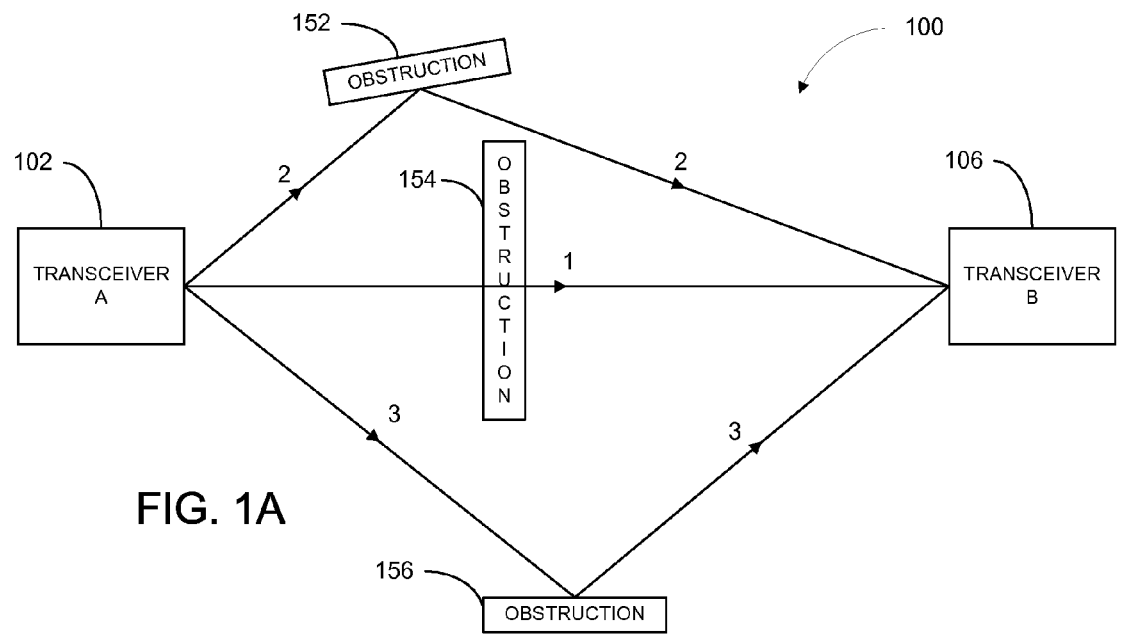
FIG. 1A illustrates a diagram depicting exemplary multiple paths that a signal may take in propagating from one device to another device.
Figure 1B:
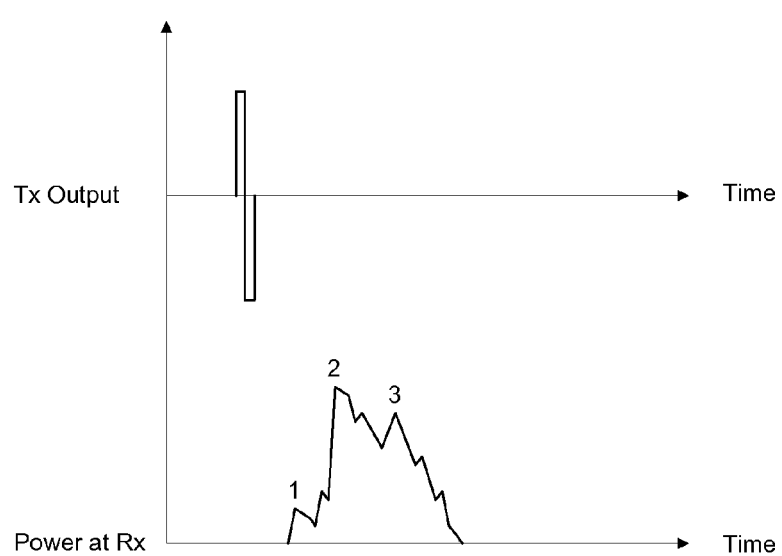
FIG. 1B illustrates graphs of an exemplary signal transmitted by a communication device and an exemplary signal received by another communication device in a multipath scenario.
Figure 2A:
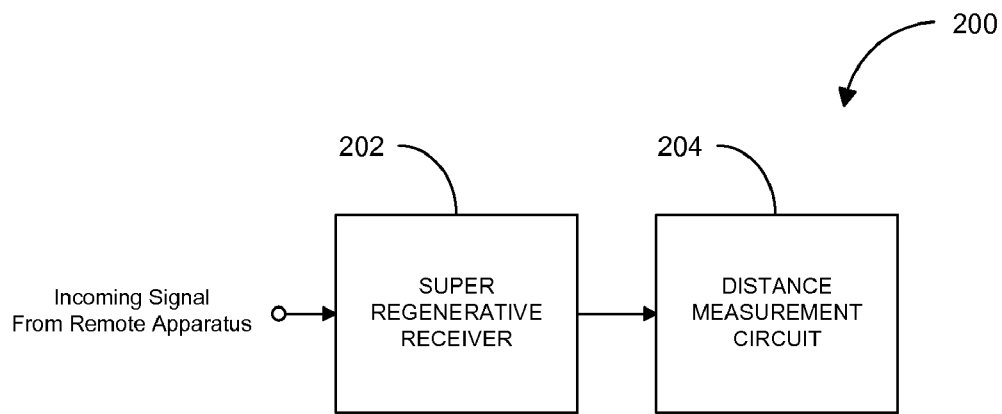
FIG. 2A illustrates a block diagram of an exemplary communication device in accordance with an aspect of the disclosure.

FIG. 2A illustrates a block diagram of an exemplary communications device 200 in accordance with an aspect of the disclosure. In general, the communications device 200 is particularly configured to detect the line-of-sight (LOS) portion of a signal received from another communications device. As discussed in the Background section, this is useful in more accurately determining the distance between the communications devices. To accomplishes this, the communications device 200 includes a super regenerative receiver front-end that has exceptional high sensitivity for LOS signal detection while, at the same time, consuming an acceptable amount of power.

More specifically, the communications device 200 comprises a super regenerative receiver 202 and a distance measurement circuit 204. The super regenerative receiver 202 is adapted to receive an incoming signal from a remote communications device, and process the incoming signal for detection of the LOS portion thereof. The distance measurement circuit 204 uses the LOS portion of the received signal processed by the super regenerative receiver to at least partially determine the distance between the communications device 200 and the remote communications device.

In the case that the communications device 200 is determining the distance to the remote communications device, the distance measurement circuit 204 determines the distance by transmitting a signal to the remote communications device at time t1, receiving the LOS portion of the signal from the remote communications device at time t2, and then determining the distance using a formula dependent on times t1 and t2, such as equation 1 provided above (e.g., distance=(t2−t1)*c/2). In the case the communications device 200 is assisting the remote communications device in determining the distance (e.g., partially determining the distance), the distance measurement circuit 204 transmits a signal to the remote communications device in response to receiving a signal from the remote device.

Figure 2B:
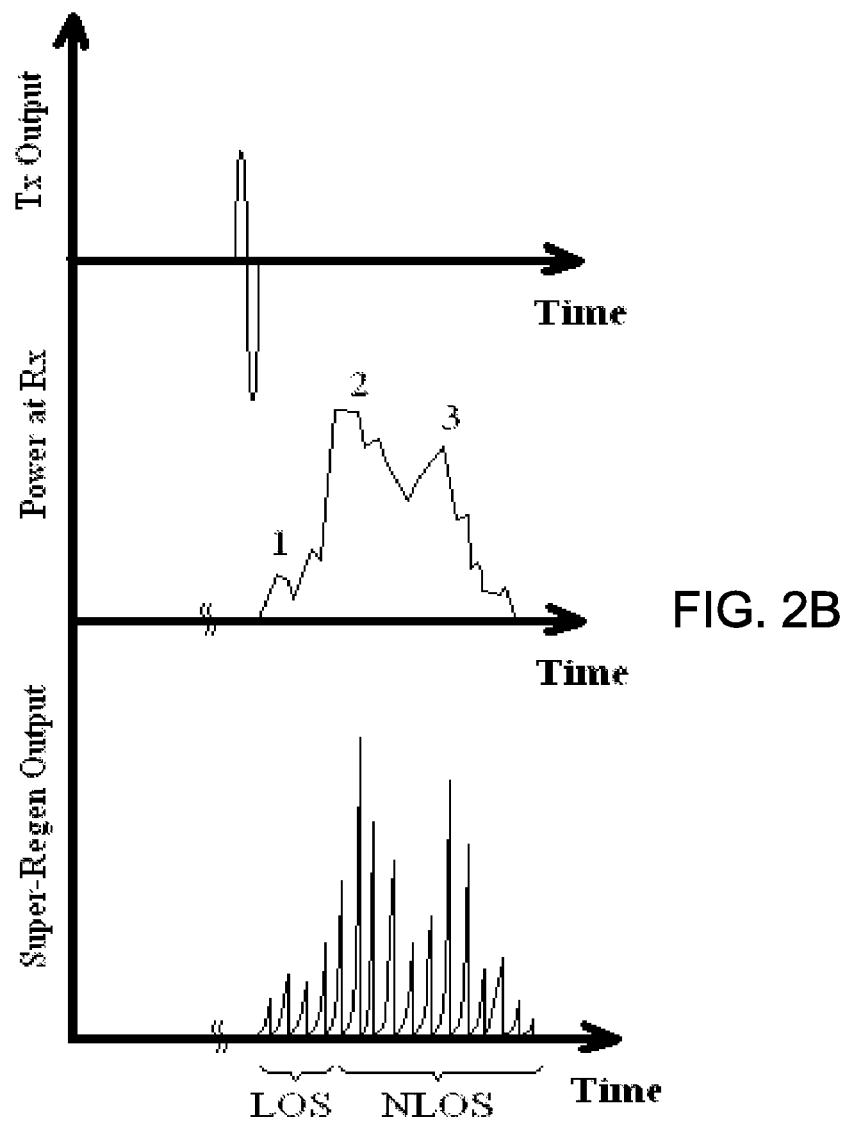
FIG. 2B illustrates graphs of an exemplary transmitted signal, an exemplary received signal, and an exemplary received signal processed by a super regenerated receiver in accordance with another aspect of the disclosure.

FIG. 2B illustrates graphs of an exemplary transmitted signal, an exemplary received signal, and an exemplary received signal processed by a super regenerated receiver in accordance with another aspect of the disclosure. The top graph depicts the transmitted signal from the remote communications device. In this example, the transmitted signal has a defined waveform, such as a full-period pulse. However, it shall be understood that other defined waveforms may be provided.

The middle graph depicts the received signal at the input of the communications device 200. The received signal has spread over time due to reception of portions of the signal propagating through different paths. As noted, the portion of the received signal designated with number "1" is the line-of-sight (LOS) portion that propagates in a direct path from the remote communications device to the communications device 200. The portions of the received signal designated with numbers "2" and "3" are non-LOS portions of the received signal.

The lower graph depicts the signal at the output of the super regenerative receiver 202. As noted, the signal at the output of the super regenerative receiver 202 includes a plurality "spikes" indicating the power level of the sampled and amplified received signal. As also noted, the first several spikes correspond to the LOS portion of the received signal, and the remaining spikes correspond to the non-LOS portion of the received signal. Because the super regenerative receiver 202 may be configured to have a relatively high sensitivity, the receiver 202 may produce an output that allows the distance measurement circuit 204 to more easily discern the LOS portion of the received signal from the noise floor and the non-LOS portions. As explained in more detail below, the communications device 200 may also perform non-coherent combining of the LOS power of several symbols to increase the signal-to-noise (SNR) ratio. The high sensitivity and non-coherent combining may be useful for accurately determining the distance between the communications device 200 and the remote communications device since the LOS portion would be associated with the time of the receipt of the signal for distance calculations, instead of the non-LOS portion.

Figure 3A:
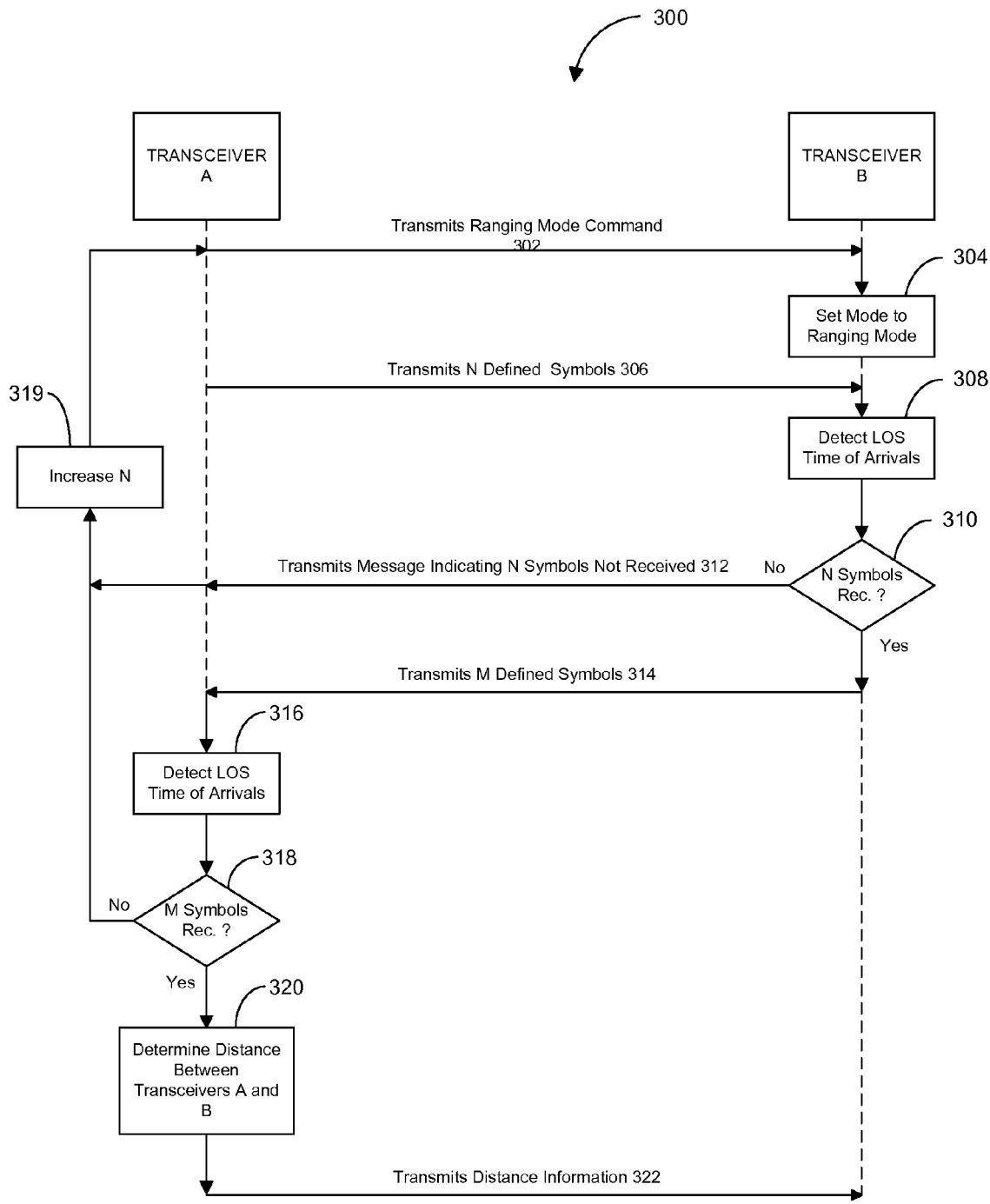
FIG. 3A illustrates a flow diagram of an exemplary method of determining an approximate distance between two transceivers in accordance with another aspect of the disclosure.

FIG. 3A illustrates a flow diagram of an exemplary method 300 of determining an approximate distance between two transceivers A and B in accordance with another aspect of the disclosure. According to the method 300, transceiver A sends a command 302 to transceiver B to operate in a ranging mode for the purpose of determining an approximate distance between transceivers A and B. In response, transceiver B sets itself in the ranging mode, and ceases transmission of any signals (block 304). Then after a predetermined time period sufficient for transceiver B to get into the ranging mode, transceiver A sends N defined symbols 306 to transceiver B. The symbols may be sent at times t=0, tp, 2*tp, 3*tp . . . (N−1)*tp, where tp is the period associated with the transmission of the symbols. The symbols, however, need not be sent in a periodic manner, and may be sent in a non-periodic manner. Transceiver B may have pre-knowledge of the N defined symbols 306 as well as its the timing relationship from symbol to symbol. Each symbol may be configured as one or more pulses.

Using its super regenerative receiver 202 and its distance measurement circuit 204, transceiver B detects the LOS time of arrivals of the N defined symbols 306 (block 308). The distance measurement circuit 204 of transceiver B then determines whether it has received the N defined symbols 306 (block 310). If transceiver B determines that it has not received the N defined symbols 306, transceiver B transmits a message 312 to transceiver A indicating that it has not received the N defined symbols 306. In response to message 312, transistor A may increase the number N of symbols 306 to be re-transmitted to transceiver B (block 319). As discussed in more detail below, the higher number of symbols transmitted may improve the signal-to-noise (SNR) at the input of transceiver B, which improves the likelihood that transceiver B will successfully receive the N symbols and detect the LOS time of arrival of N symbols due to higher SNR 306. Transceiver A may then re-initiate the ranging mode operation again by transmitting command 302 or may, at this time, retransmit the N defined symbols 306. If, on the other hand, transceiver B determines that it has received the N defined symbols 306, it transmits M defined symbols 314 to transceiver A. Transceiver B may begin transmitting the M defined symbols 314 at time N*tp +td, where td is the propagation delay along the LOS path of each symbol from transceiver A to transceiver B. Accordingly, in the case that M=N, transceiver A may receive the symbols respectively at times t=N*tp+2*td, (N+1)*tp+2*td, (N+2)*tp+2*td . . .. (2*N−1)

*tp+2*td. Transceiver A may have pre-knowledge of the M defined symbols 314. The M defined symbols 314 could be the same as or the N defined symbols 306 or may be different. Additionally, the number M of symbols 314 may be related (e.g., proportional) to the number N of symbols 306.

Using its super regenerative receiver 202 and its distance measurement circuit 204, transceiver A detects the LOS time of arrivals of the M defined symbols 314. The distance measurement circuit 204 of transceiver A then determines whether it has received the M defined symbols 314 or that it cannot determine the time of arrivals of the M defined symbols (block 318). If transceiver A determines that it has not received the M defined symbols 314 or cannot determine the time of arrival of the M defined symbols 314, transceiver A may increase the number N of symbols 306 to be re-transmitted to transceiver B (block 319). Since, as discussed above, M may be related (e.g., proportional) to N, then by transceiver A increasing N, transceiver B increases M. This also improves the likelihood that transceiver A will be able to better detect the LOS time of arrival of M symbols receive the M symbols 314 from transceiver B.

The transceiver A may then re-initiate the ranging mode operation again by transmitting command 302 or may, at this time, retransmit the N defined symbols 306. If, on the other hand, transceiver A has determined that it has received the M defined symbols 314, it then determines the distance between transceivers A and B (block 320). Transceiver A may then transmit the distance information 322 to transceiver B. In this scenario, transceiver A makes the determination of the distance, and transceiver B is assisting in the determination of the distance or partially determining the distance.

Figure 3B:
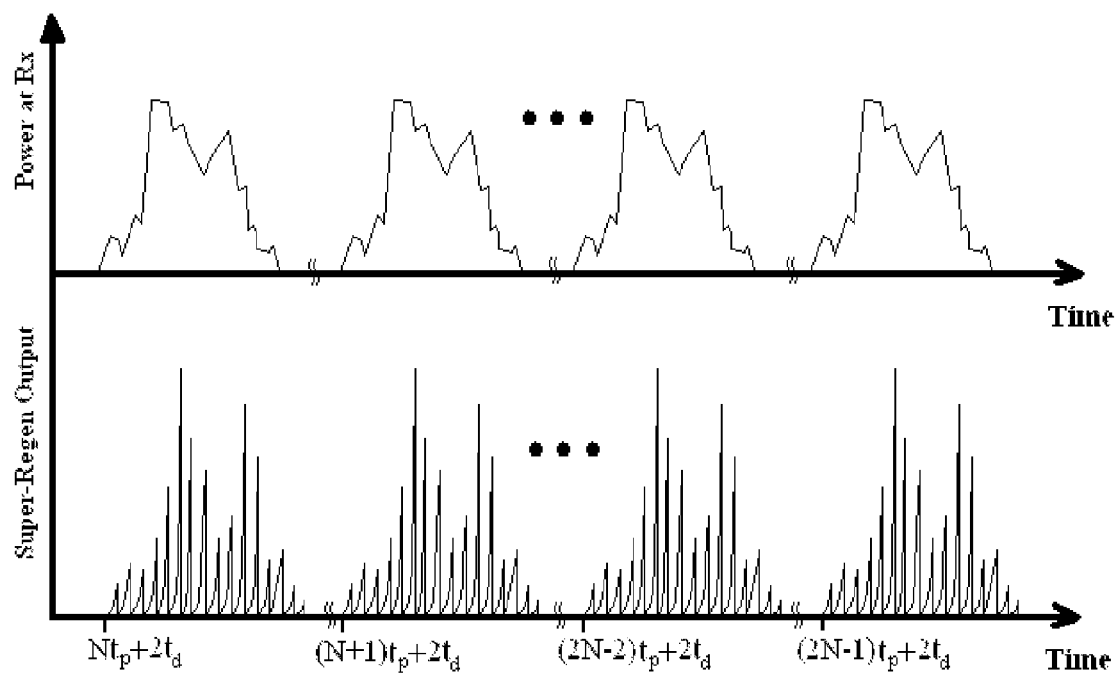
FIG. 3B illustrates graphs of an exemplary received signal and an exemplary received signal processed by a super regenerative receiver in accordance with another aspect of the disclosure.

FIG. 3B illustrates graphs of an exemplary received signal at the input of transceiver A, and an exemplary received signal processed by the super regenerative receiver 202 of transceiver A in accordance with another aspect of the disclosure. In this example, the number M of defined symbols 314 received from transceiver B is the same as the number N of defined symbols 306. The top graph illustrates the received signal at the input of transceiver A. The received signal includes the N defined symbols received from transceiver B. As previously discussed, each symbol transmitted by transceivers A and B may include one or more pulses. Additionally, the symbols are transmitted with a period represented as tp. As shown, each symbol received by transceiver A is spread over time due to signal propagating via multiple paths of different lengths from transceiver B to transceiver A.

The bottom graph illustrates the received signal as processed by the super regenerative receiver 202 of transceiver A. As previously discussed, the super regenerative receiver 202 samples and amplifies the received signal. Thus, each symbols includes a plurality of spikes indicating an amplified sample of the received signal. As previously discussed, the first several spikes of each symbol pertains to the LOS portion of the received symbol, and the remaining spikes of each symbol pertains to non-LOS portions of the received symbol. As noted, the LOS portion of the first symbol was received at time Ntp+2td, the LOS portion of the second symbol was received at time (N+1)tp+2td, the LOS portion of the second-to-last symbol was received at time (2N−2)tp+2td, and the LOS portion of the last symbol was received at time (2N−1)tp+2td. The times are referenced from the time transceiver A sent the first symbol to transceiver B. As previously discussed, tp is the period of transmission of the symbols, and td is the one-way LOS propagation delay of the signal from transceiver to transceiver.

Thus, by measuring the time ttotal of the arrival of the LOS portion of the received symbol, transceiver A can determine the distance to transceiver B by the following equation:

$$\text{Distance} = (t\text{total} - (2N-1)*tp/2)*c \qquad \text{Eq. 2}$$

where c is the speed of light. The uncertainty in the time of arrival of the symbols may be determined by the quench cycle of the super regenerative receiver 202. Since the quench cycle may be in the GHz range, the uncertainty in the time of arrival of the symbols is relatively low. For example, if the quench cycle of the super regenerative receiver 202 is at 4 GHz, then the uncertainty in the distance measurement may be given by c/4 GHz, which is approximately equal to 7.5 centimeters. This is relatively small or even negligible when the transceivers are several meters or more apart from each other.

As FIG. 3B illustrates, the LOS portion of each symbol is at a relatively low power as compared to the non-LOS portions of each symbols. Also, the LOS portion of each symbol is very close to the ambient noise floor. As previously discussed, because of the relatively high sensitivity of the super regenerative receiver 202, the LOS portion of each symbol may be more easily discernable from the noise floor. Additionally, because a plurality of symbols are transmitted, the distance measurement circuit 204 may perform non-coherent combining of the LOS portions of the symbols in order to average out the noise and thereby improve the signal-to-noise ratio (SNR). This further improves the detection of the LOS portions of the symbols from the noise floor.

Figure 4A:
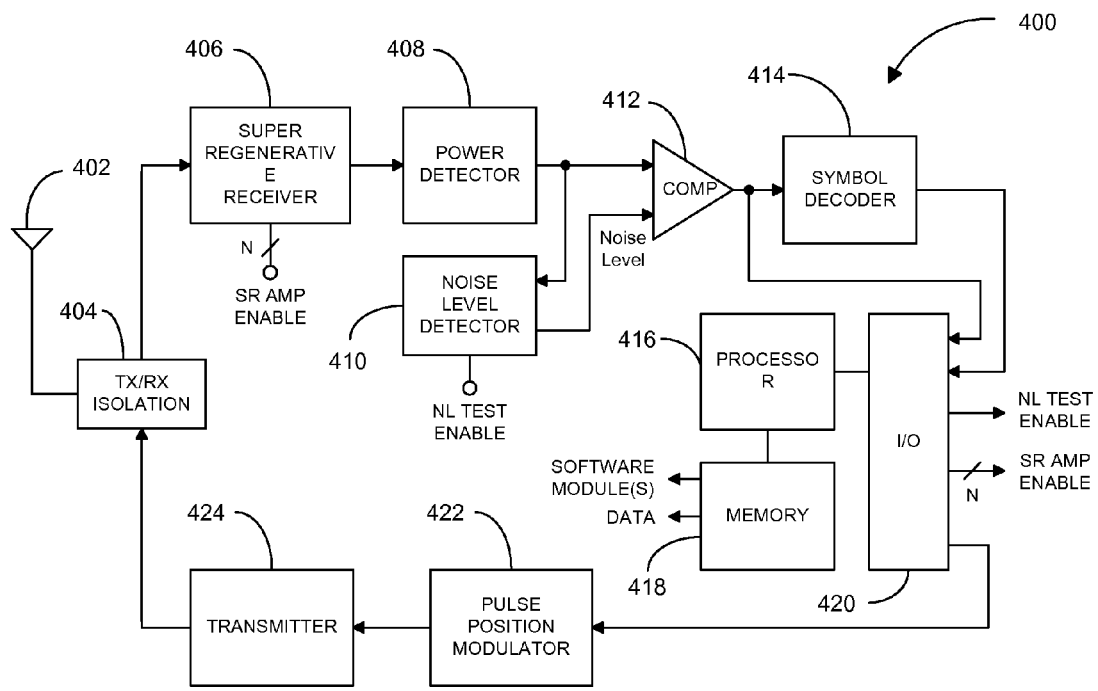
FIG. 4A illustrates a block diagram of an exemplary communications device in accordance with another aspect of the disclosure.

FIG. 4A illustrates a block diagram of an exemplary communications device 400 in accordance with another aspect of the invention. The exemplary communications device 400 may be a more detailed embodiment of a communications device that is configured for distance measurement in accordance with another aspect of the disclosure. The communications device 400 comprises an antenna 402, a transmit/receive (Tx/Rx) isolation device 404, a super regenerative receiver 406, a power detector 408, a noise level detector 410, a comparator 412, a symbol decoder 414, a processor 416, a memory 418, an input/output (I/O) device 420, a pulse position modulator 422, and a transmitter 424.

The antenna 402 servers to receive signals from a remote communications device and transmit signals to the remote communication device, both via a wireless medium. The Tx/Rx isolation device 404 serves to isolate the input of the super regenerative receiver 406 from the output of the transmitter 424. The super regenerative receiver 406 serves to receive and amplify the signal received from a remote communications device in a relatively high sensitivity manner in order to discern the LOS portion of the received signal from the noise floor. The power detector 408 serves to generate a signal indicative of the power level at the output of the super regenerative receiver 406. The noise level detector 410 serves to generate a signal indicative of the power level of the ambient noise. The comparator 412 serves to generate an output related to the comparison of the power level at the output of the super regenerative receiver 406 and the power level of the ambient noise. For example, the comparator 412 may generate a signal indicating that the power level of receiver output is a defined threshold (e.g., 2 or 3 dB) above the power level of the ambient noise.

The symbol decoder 414 is adapted to determine the nature of the symbol received. For example, the symbol decoder 414 may determine that the signal received is a logic one or a logic zero. The I/O device 420 serves to relay signals from the outputs of the comparator 412 and symbol decoder 414 to the processor 416, and relay signals from the processor 416 to the super regenerative receiver 406, the noise level detector 410, and the pulse position modulator 422. The memory 418 serves to store one or more software modules used to control the processor 416 in performing its various operations, and data which is manipulated by the processor 416 in performing its various function, as further discussed below. The pulse position modulator 422 serves to control the transmitter 424 in transmitting a signal to a remote communications device in response to the processor 416. And, the transmitter 424 serves to transmit the signal to the remote communications device in response to the pulse position modulator 422.

The communications device 400 may be configured in several modes. In particular, the communications device 400 may be configured in a low power mode to reduce the amount of power it consumes during times when the device is not receiving a signal from or transmitting a signal to a remote communications device. The communications device 400 may also be configured in a jam detect mode to detect the presence of one or more jamming signals within the defined receiving bandwidth, and to eliminate or reduce the detected jamming signals. The communications device 400 may further be configured in a noise level calibration mode to determine the power level of the ambient noise. Additionally, the communications device 400 may be configured in a ranging mode for determining or assisting in the determination of the distance to a remote communications device. In addition, the communications device 400 may be configured in a receive mode to receive a signal from a remote communications device. Also, the communications device 400 may be configured in a transmit mode to transmit a signal to a remote communications device.

In the low power mode, the processor 416 may disable or place in low power mode one or more of the components of the communications device 400. For example, the processor 416 may send a command to the super regenerative receiver 406 via the I/O device 420 to disable one or more amplifiers of the super regenerative receiver 406 in order to reduce the amount of power consumed by the communications device 400. The processor 416 may also configure other components of the communications device 400 is a low power mode. Thus, this may make the communications device 400 power efficient because when it is not transmitting or receiving, the communications device 400 may configure itself in a low power mode to conserve power, such as power supplied from a battery source.

In the jam detect mode, the processor 416 checks whether there are any jamming signals present within the defined receiving bandwidth. This is better explained with reference to the exemplary embodiments illustrated in FIGS. 7A-B. In summary, during times when the communications device 400 is not communicating with a remote communications device, the processor 416 disables all of the N amplifiers of the super regenerative receiver 406 via the I/O device 420 using the SR Amp Enable signal. The processor 416 then enables only one of the N amplifiers at a time, and monitors the output of the comparator 412 via the I/O device 420. If the output of the comparator 412 indicates that the output of the power detector 408 is greater than the ambient noise signal generated by the noise level detector 410 by a defined threshold, then the processor 416 determines that there is a jamming signal present, and may consequently disable the corresponding amplifier via the I/O device 420. The processor 416 then performs the same test for the next super regenerative amplifier, and continues until all N amplifiers have been checked.

In the noise level calibration mode, the processor 416 calibrates the noise level detector 410 to generate a signal indicative of the ambient noise power level. This is performed so that the comparator 412 can accurately indicate when there is a presence of a received signal, such as when the power level of the received signal exceeds the power level of the ambient noise by a defined threshold. In the noise level calibration mode, the processor 416 may cause the input of the super regenerative receiver 406 to be coupled to, for example, a 50-Ohm termination. This is done so that the super regenerative receiver 406 and the power detector 408 do not generate outputs resulting from a received signal, but only resulting from the ambient noise. The processor 416 then sends a command (e.g., the NL Test Enable command) to the noise level detector 410 via the I/O device 420 to measure the output of the power detector 408, and use that measurement to calibrate the signal indicative of the power level of the ambient noise. Alternatively, the processor 416 may cause the noise level detector 410 to use the output of a temperature sensor (not shown) to calibrate the signal indicative of the power level of the ambient noise.

In the ranging mode, the communications device 400 may serve as the initiator of the distance measurement process, such as was transceiver A in the method 300 previously described with reference to FIG. 3A. In this regard, the processor 416 is adapted to perform the operations of transceiver A, as previously discussed. In particular, the processor is adapted to generate the ranging mode command 302 and transmit it to the remote communications device via the components for transmitting signals, such as I/O device 420, pulse position modulator 422, transmitter 424, and antenna 402. The processor 416 is further adapted to transmit the N defined symbols 306 to the remote communications device via the same components for transmitting signals. The processor 416 is further adapted to receive the message 412 indicating non-receipt of the N defined symbols 306 from the remote communications device via the components for receiving signals, such as the antenna 402, super regenerative receiver 406, power detector 408, comparator 412, symbol decoder 414, and I/O device 420.

The processor 416 is further adapted to receive the M defined symbols 314 from the remote communications device via the same components for receiving signals. The processor 416 may have pre-knowledge of the M defined symbols 314 by having the information stored in the memory 418. Using this information, the processor 416 is further adapted to determine whether it has received the M defined symbols 314. The processor 416 is further adapted to re-transmit the ranging mode command 302 and/or the N defined symbols 306 if it has determined that it has not received the M defined symbols 314 from the remote communications device. The processor 416 is further adapted to detect the LOS times of arrival of the M defined symbols 314 by monitoring when the output of the comparator 412 first indicates the presence of a signal during the reception of each symbol. As previously discussed, the processor 416 uses the time associated with the transmission of the N defined symbols 306 and the time associated with the reception of the LOS portion of the M defined symbols 314 to determine the distance to the remote communications device. The processor 416 is further adapted to transmit the distance information to the remote communications device via the same components for transmitting signals.

In the ranging mode, the communications device 400 may be merely assisting the remote communications device in determining the distance (e.g., partially determining the distance), as did the transceiver B in the method 300 previously described with reference to FIG. 3A. In this regard, the processor 416 is adapted to perform the operations of transceiver B, as previously discussed. In particular, the processor 416 is adapted to receive the ranging mode command 302 from the remote communications device via the same components for receiving signals. The processor 416 is further adapted to set itself in the ranging mode, where it ceases transmitting signals and perform the functions necessary for the remote communications device to determine the distance between the devices. The processor 416 is further adapted to detect the LOS times of arrival of the N defined symbols 306 by monitoring when the output of the comparator 412 first indicates the presence of a signal during the reception of each symbol.

The processor 416 may have pre-knowledge of the N defined symbols 306 by having the information stored in the memory 418. Using this information, the processor 416 is further adapted to determine whether it has received the N defined symbols 306. The processor 416 is further adapted to transmit the non-receipt of N symbol message 312 to the remote communication device via the components for transmitting signals, if it has determined that it has not received the N defined symbols 306. The processor 416 is further adapted to transmit the M defined symbols 314 to the remote communication device via the components for transmitting signals, if it has determined that it has received the N defined symbols 306. The processor 416 is further adapted to receive the distance information 322 from the remote communications device via the components for receiving signals.

In the receive mode, the processor 416 is adapted to receive information from the remote communications device via the components of for receiving signals. In the transmit mode, the processor 416 is adapted to transmit signals to the remote communications device via components for transmitting signals.

Figure 4B:
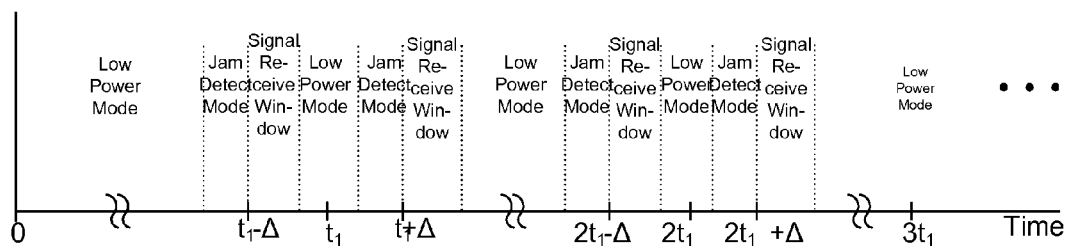
FIG. 4B illustrates a timing graph of exemplary modes in which the communication device operates in accordance with another aspect of the disclosure.

FIG. 4B illustrates a timing graph of the exemplary modes in which the communication device 400 operates in receiving signals from a remote communications device in accordance with another aspect of the disclosure. Prior to time zero as depicted in the graph, the communications device 400 may be operated in the noise level calibration mode in order to calibrate the noise level detector 410 before receiving information from a remote communications device. At time zero, the communications device 400 may enter the low power mode in order to conserve battery power during times when it is not receiving or transmitting signals. At a certain time interval before entering a signal receive time window, the communications device 400 may enter the jam detect mode in order to detect for the presence of jamming signals within the defined receiving bandwidth, and to disable one or more of the N amplifiers of the super regenerative receiver 406 to reduce or eliminate the jamming signals at the output of the receiver 406. This is performed prior to a signal receive window to eliminate or reduce a false detection of received information from the jamming signals.

The communications device 400 may then enter a first signal receive time window at time t1−Δ. If the communications device 400 uses a pulse position demodulating technique, a signal received within the first signal receive window (instead of within a second signal receive window) may mean that the data being received is, for example, a logic zero. After the first signal receive window, the communications device 400 may then enter the low power mode in order to conserve battery power. After the low power mode, the communications device 400 enters the jam detect mode in order to detect for the presence of one or more in-band jamming signals before entering another signal receive window. Then, the communications device 400 enters a second signal receive time window at time t1+Δ. If the communications device 400 receives a signal within the second signal receive window (instead of within the first signal receive window), it may mean that the data being received is, for example, a logic one.

The communications device 400 then enters another low power mode in order to conserve battery power when the device is not receiving or transmitting. Then the communications device 400 repeats the same set of modes for the subsequent interval for receiving information from a remote communications device. This interval corresponds to the central time of 2 μl, as indicated in the graph. The process continues for all other remaining intervals for receiving data from the remote communications device.

Figure 5A:
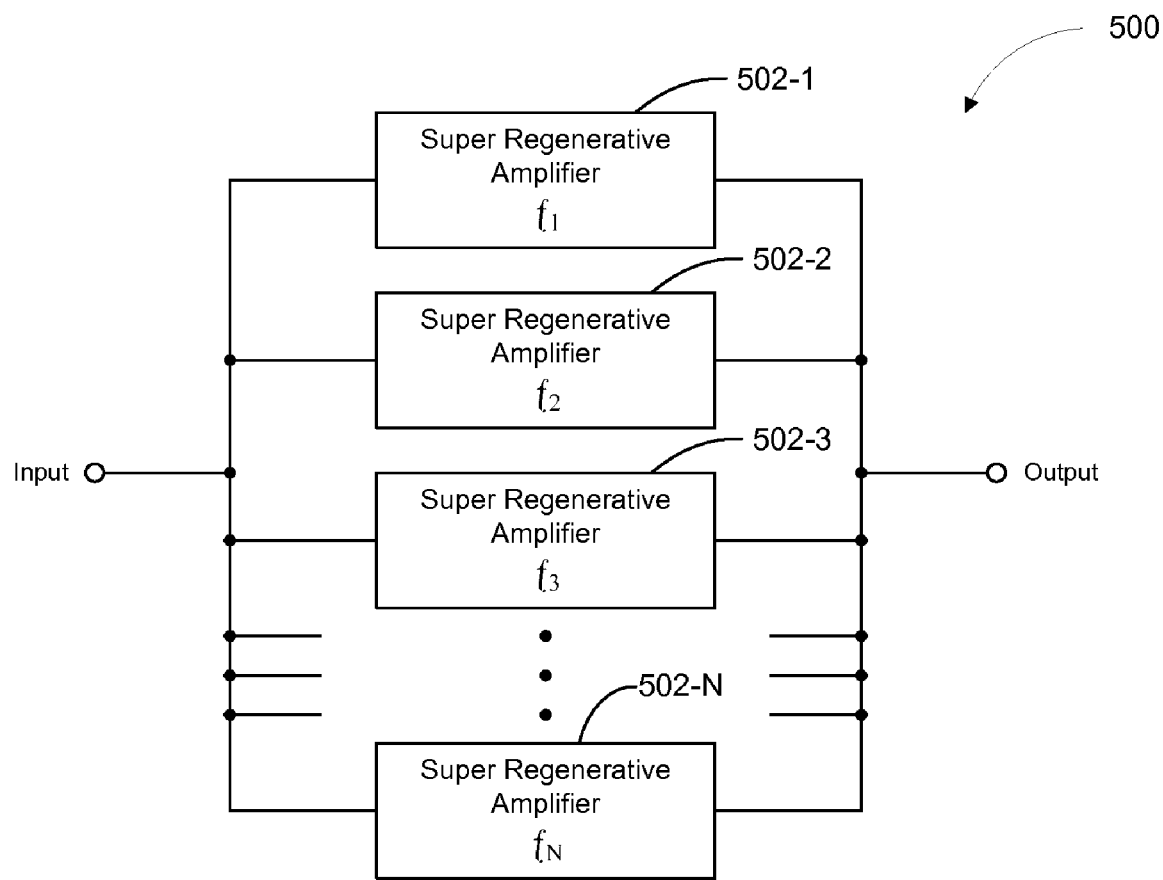
FIG. 5A illustrates a block diagram of an exemplary super regenerative (SR) apparatus in accordance with another aspect of the disclosure.

FIG. 5A illustrates a block diagram of an exemplary super regenerative (SR) apparatus 500 in accordance with an aspect of the disclosure. The SR apparatus 500 is capable of receiving a signal via an input, amplifying the signal via a plurality of parallel SR amplifiers tuned respectively to distinct frequency bands, and generating the amplified signal at an output. In its most typical application, the SR apparatus 500 may be used as a receiver as part of a wired or wireless communications device. However, it shall be understood that the SR apparatus 500 may also be used as part of a transceiver. As discussed in more detail below, the SR apparatus 500 is capable of effectively dealing with out-of-band jamming signals as well as in-band jamming signals.

More specifically, the SR apparatus 500 comprises a plurality of SR amplifiers 502-1 through 502-N coupled in parallel between an input and an output. In this example, the SR apparatus 500 has N number of SR amplifiers. Each of the SR amplifiers is tuned to a distinct frequency band. For example, SR amplifier 502-1 is tuned to a frequency band having a center frequency represented as f1, SR amplifier 502-2 is tuned to a frequency band having a center frequency represented as f2, and SR amplifier 502-N is tuned to a frequency band having a center frequency represented as fN.

Generally, the distinct frequency bands may reside within a defined bandwidth, such as an ultra-wide band (UWB) channel. For example, an ultra-wide band (UWB) channel may be defined as having a fractional bandwidth on the order of 20% or more, a bandwidth on the order of 500 MHz or more, or a fractional bandwidth on the order of 20% or more and a bandwidth on the order of 500 MHz or more. The number N of SR amplifiers, the respective quality factors (Q) of the SR amplifiers, and the respective center frequencies f1 to fN of the distinct frequency bands may be configured to provide a defined minimum gain, a defined gain ripple, or a defined frequency response across the defined bandwidth.

As discussed in more detail below, the SR apparatus 500 may be useful in eliminating or reducing out-of-band jamming signals as well as in-band jamming signals. For example, each SR amplifier, and in particular, the SR amplifiers at the ends of the defined bandwidth, such as SR amplifiers 502-1 and 502-N, may be configured to have a relatively high quality factor (Q). As such, the SR amplifier will have a relatively high gain near its center frequency, and high attenuation for frequencies relatively far from its center frequency. Thus, the SR amplifier may inherently attenuate jamming signals that may reside outside of the defined bandwidth, thereby providing substantial rejection or elimination of out-of-band jamming signals.

With regard to in-band jamming signals, the SR apparatus 500 may be configured with a relatively large number N of SR amplifiers. In such as case, each SR amplifier may amplify signals only within a relatively small sub-band within the defined bandwidth. Thus, if the jamming signal lies within one of the sub-bands, the corresponding SR amplifier may be turned off or disabled to prevent or reduce the presence of the jamming signal at the output of the SR apparatus 500. Since, as discussed above, the sub-band may be relatively small as compared to the defined bandwidth, the effect of turning off or disabling the SR amplifier corresponding to the jamming signal may be negligible or minimal to a broadband (e.g., UWB) signal being received and amplified by the SR apparatus 500.

Figure 5B:
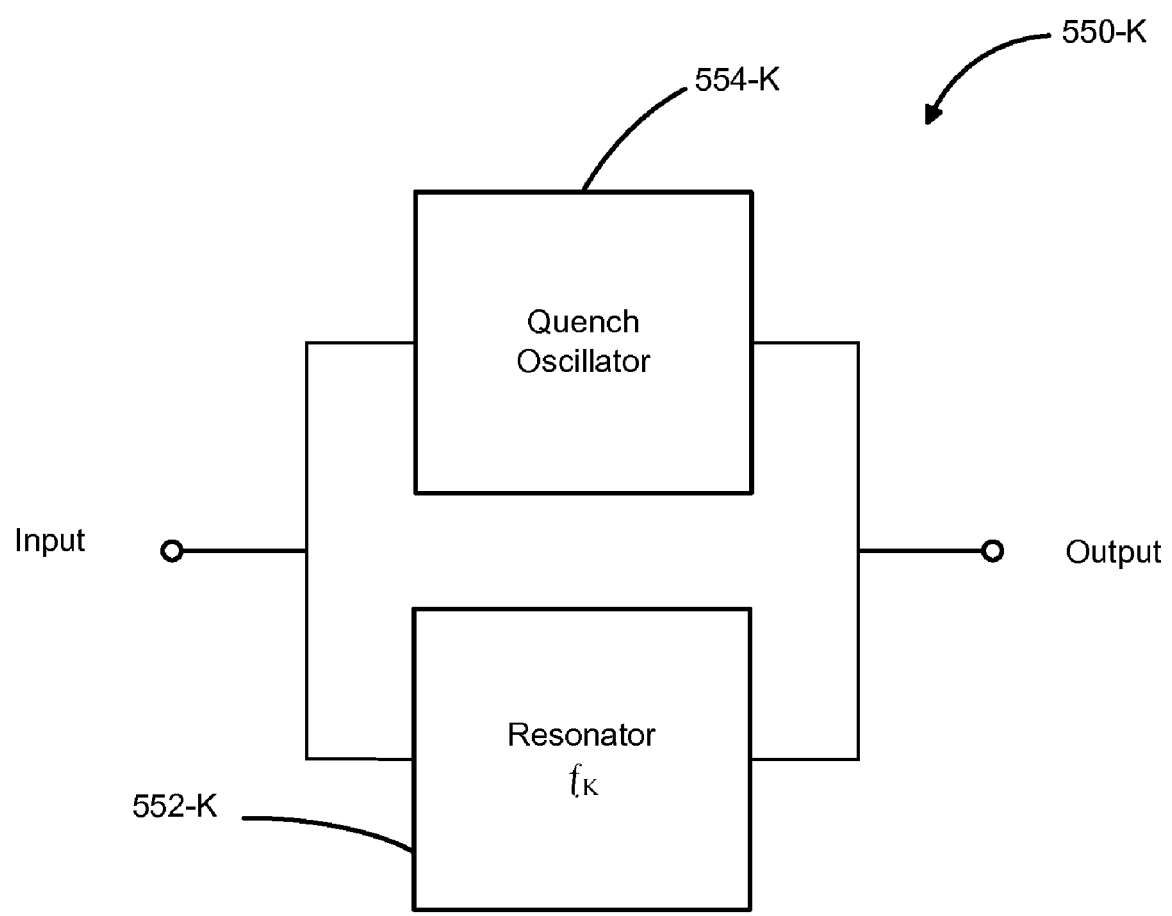
FIG. 5B illustrates a block diagram of an exemplary super regenerative (SR) amplifier in accordance with another aspect of the disclosure.

FIG. 5B illustrates a block diagram of an exemplary super regenerative (SR) amplifier 550-K in accordance with another aspect of the disclosure. The SR amplifier 550-K may be a detailed example of any SR amplifier described herein. The SR amplifier 550-K comprises a resonator 552-K and a quench oscillator 554-K. The resonator 552-K may comprise a tank circuit, a saw resonator, or other type of resonator. Each resonator may be tuned manually or electronically such as by an analog circuit or a digital circuit, such as a processor. The quench oscillator 554-K may be periodically quenched. The quench frequency may be at least twice the bandwidth of the defined bandwidth that the SR apparatus is designed to cover. Thus, if the defined bandwidth is between fa and fb, the quench frequency may be at least 2*(fb−fa).

Figure 6A:
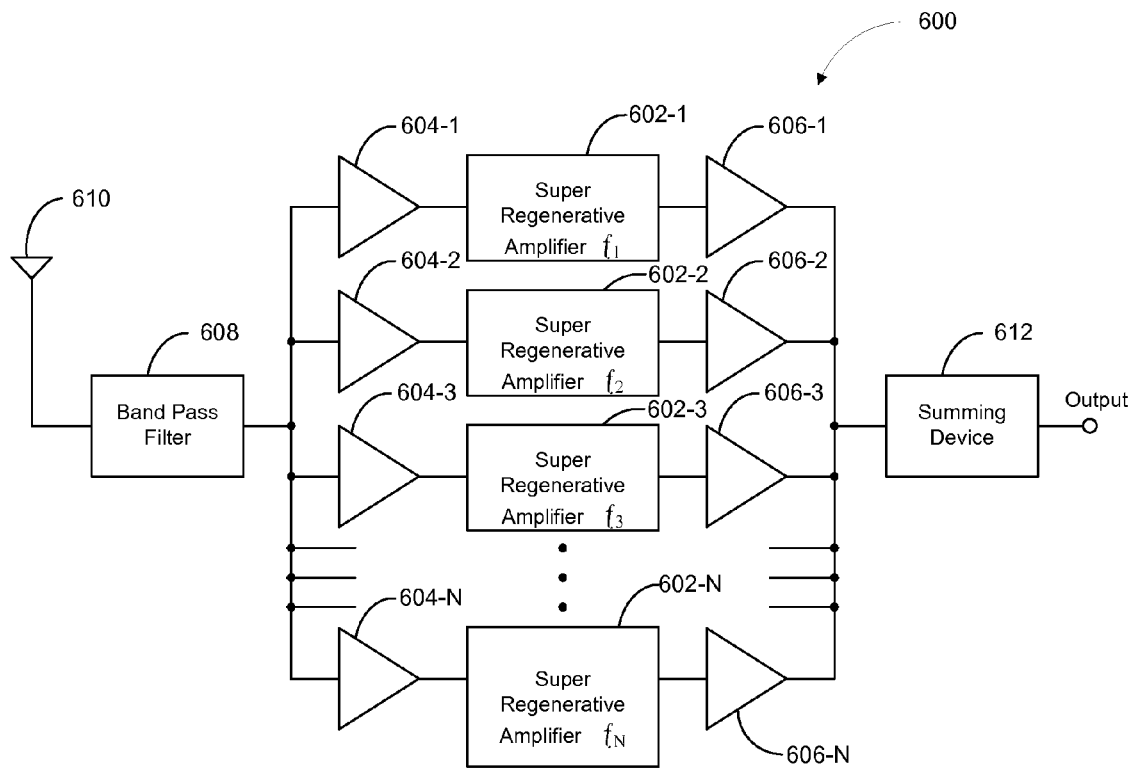
FIG. 6A illustrates a block diagram of an exemplary super regenerative (SR) receiver in accordance with another aspect of the disclosure.

FIG. 6A illustrates a block diagram of an exemplary super regenerative (SR) receiver 600 in accordance with another aspect of the disclosure. The SR receiver 600 may be one example of a detailed exemplary embodiment of the SR apparatus 500 discussed above. In this example, the SR receiver 600 comprises an antenna 610, a band pass filter (BPF) 608, a plurality of input isolation amplifiers 604-1 through 604-N, a plurality of SR amplifiers 602-1 through 602-N, a plurality of output isolation amplifiers 606-1 through 606-N, and a summing device 612.

More specifically, the band pass filter (BPF) 608 is coupled between the antenna 610 and the inputs of the plurality of input isolation amplifiers 604-1 through 604-N. The outputs of the input isolation amplifiers 604-1 through 604-N are coupled respectively to the inputs of the SR amplifiers 602-1 through 602-N. The outputs of the SR amplifiers 602-1 through 602-N are coupled respectively to the inputs of the output isolation amplifiers 606-1 through 606-N. The outputs of the output isolation amplifiers 606-1 through 606-N are coupled to the input of the summing device 612.

The antenna 610 receives the intended signal and possibly out-of-band and/or in-band jamming signals. The band pass filter (BPF) 608 provides an initial filtering of the received signals mainly to reduce or eliminate out-of-band jamming signals at the inputs of the input isolation amplifiers 604-1 through 604-N. Since, as discussed above, the SR amplifiers 602-1 through 602-N have inherent out-of-band rejection characteristics, the filtering specification for the band pass filter (BPF) 608 may be relaxed. Alternatively, the band pass filter (BPF) 608 may be eliminated altogether.

The input and output isolation amplifiers isolate the SR amplifiers from each other. This is to prevent injection locking of one SR amplifier to another. Additionally, the input isolation amplifiers also assist in preventing power leaking from the SR amplifiers to the antenna. Otherwise, this may generate unwanted radiation, which may result in a violation of governmental laws, rules or regulations that govern the control of electromagnetic radiation emissions. The parallel SR amplifiers 602-1 through 602-N respectively amplify the corresponding frequency components of the received signal within the distinct frequency bands, respectively. The summing device 612 reconstructs the amplified received signal from the corresponding frequency components received respectively from the outputs of the output isolation amplifiers 606-1 through 606-N.

As discussed above with reference to the previous embodiments, the SR amplifiers 602-1 through 602-N are tuned to distinct frequency bands having respective center frequencies represented as f1 to fN. The distinct frequency bands may reside within a defined bandwidth, such as an ultra-wide band (UWB) channel. The number N of SR amplifiers, the respective quality factors (Q) of the SR amplifiers, and the respective center frequencies f1 to fN of the distinct frequency bands may be configured to provide a defined minimum gain, a defined gain ripple, or a defined frequency response across the defined bandwidth. This is better explained with reference to the exemplary graph depicted in FIG. 6B.

Figure 6B:
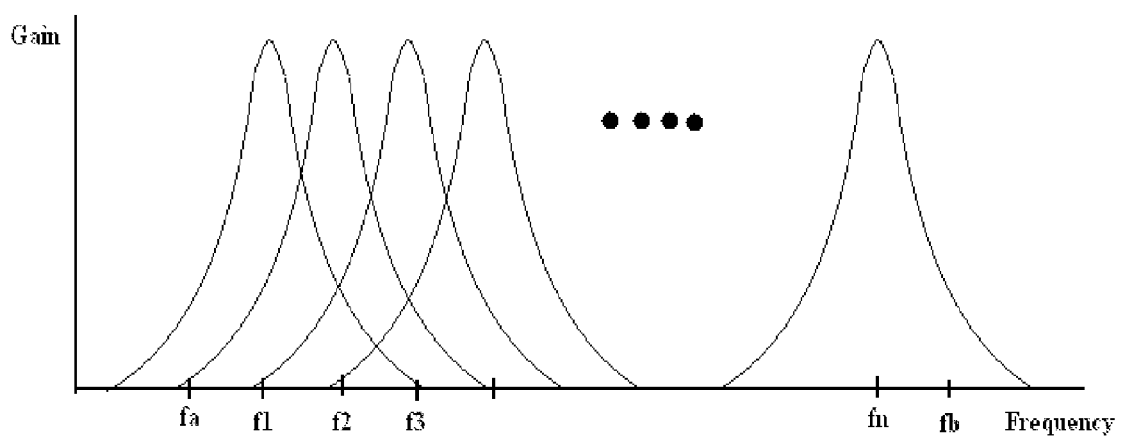
FIG. 6B illustrates a graph of an exemplary frequency response pertaining to the exemplary super regenerative (SR) receiver in accordance with another aspect of the disclosure.

FIG. 6B illustrates a graph of an exemplary frequency response pertaining to the exemplary super regenerative (SR) receiver 600 in accordance with another aspect of the disclosure. The x- or horizontal axis of the graph represents the frequency. The y- or vertical axis represents gain. As the graph illustrates, the defined bandwidth ranges from a relatively low frequency represented as fa to a relatively high frequency represented as fb. The graph also shows the frequency responses of the respective SR amplifiers 602-1 through 602-N. For example, the left-most frequency response having a center frequency of f1 pertains to the SR amplifier 602-1. Similarly, the frequency response having a center frequency of f2 pertains to the SR amplifier 602-2. In a like manner, the frequency response having a center frequency of fn pertains to the SR amplifier 602-N.

Note that, in this example, the frequency responses of the SR amplifiers overlap with each other. This is done to provide an overall frequency response for the defined bandwidth. The center frequency governs the position of the individual frequency response within the defined bandwidth. The quality factor (Q) governs the width of the individual frequency response. For example, the higher quality factor (Q), the more narrow is the individual frequency response. Conversely, the lower quality factor (Q), the wider is the individual frequency response. Also, the number N of SR amplifiers affect the overall frequency response for the defined bandwidth. As discussed above, by properly selecting the number N of SR amplifiers, the respective quality factors (Q) of the SR amplifiers, and the respective center frequencies f1 to fN of the distinct frequency bands, a desired overall frequency response for the defined bandwidth may be achieved, which may include a defined minimum gain and/or a defined gain ripple.

Figure 7A:
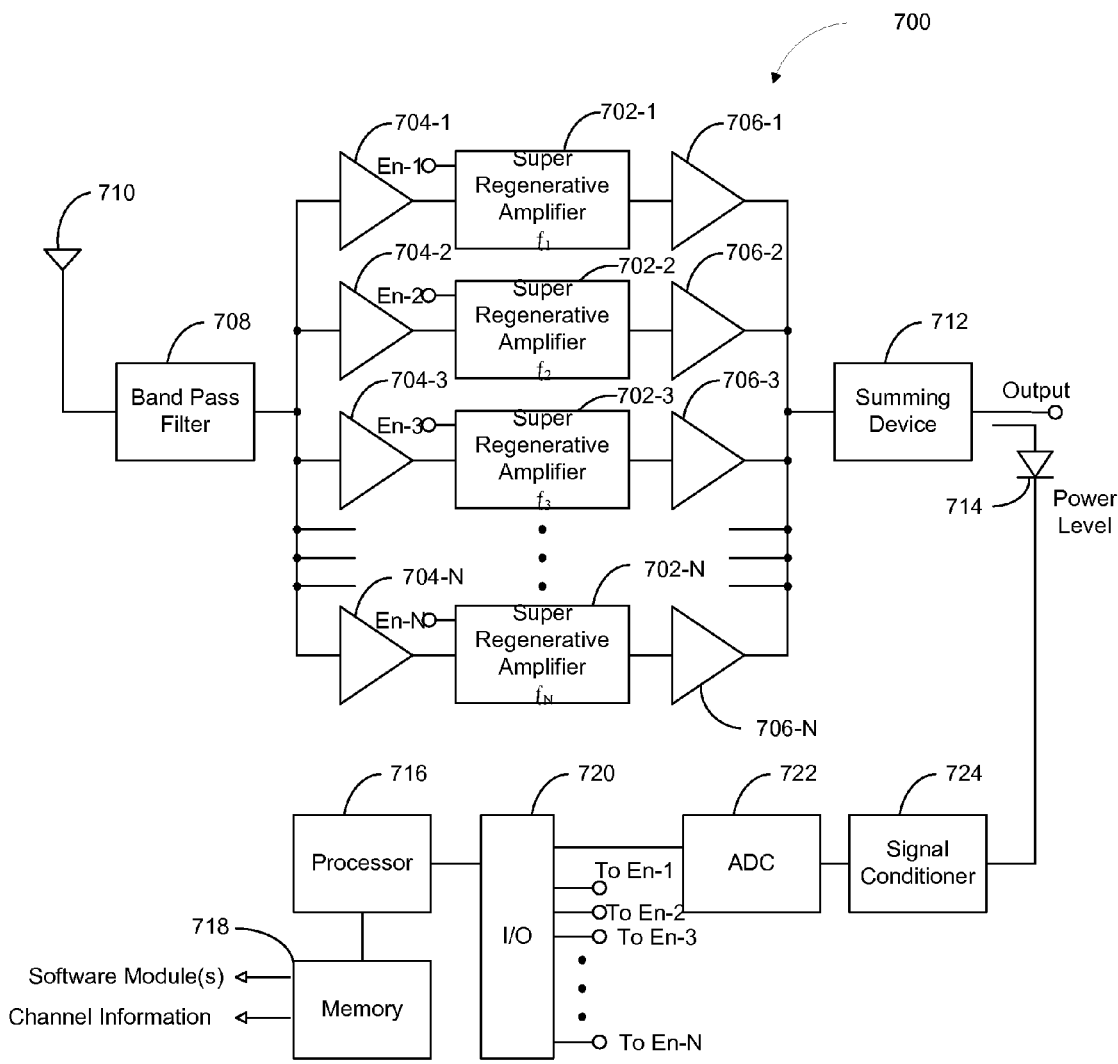
FIG. 7A illustrates a block diagram of an exemplary super regenerative (SR) receiver in accordance with another aspect of the disclosure.

FIG. 7A illustrates a block diagram of an exemplary super regenerative (SR) receiver 700 in accordance with another aspect of the disclosure. The SR receiver 700 is particularly configured to reduce or substantially reject in-band jamming signals. Similar to the previous embodiment 600, the SR receiver 700 comprises an antenna 710, a band pass filter (BPF) 708, a plurality of input isolation amplifiers 704-1 through 704-N, a plurality of SR amplifiers 702-1 through 702-N, a plurality of output isolation amplifiers 706-1 through 706-N, and a summing device 712. These items were discussed in detail above with reference to SR receiver 600.

The SR receiver 700 further comprises a power detector 714, a signal conditioner 724, an analog-to-digital converter (ADC) 722, an input/output (I/O) device 720, a processor 716, and a memory 718. The power detector 714 generates a signal indicative of the power level at the output of the SR receiver 700. The signal conditioner 724 modifies (e.g., amplifies, filters, etc.) the signal from the power detector 714 so it is at an appropriate level with reduced noise for conversion into digital format. The ADC 722 converts the conditioned signal into digital format, which is subsequently sent to the processor 716 via the I/O device 720 for analysis. The I/O device 720 receives the signal from the ADC 722 and passes it to the processor 716, as well as passes enable/disable signals En-1 through En-N from the processor 716 respectively to the SR amplifiers 702-1 through 702-N.

The processor 716 performs the various operations described hereinafter to reduce or substantially eliminate in-band jamming signals. The memory 716, which could be any type of computer readable medium, such as random access memory (RAM), read only memory (ROM), magnetic disk, optical disc, and variations thereof, stores one or more software modules that controls the processor 716 in performing its various operations. The memory 718 may store data as well, such as information as to which channels or SR amplifiers are enabled and which channels or SR amplifiers are disabled to reduce or eliminate in-band jamming signals. The following describes an exemplary method performed by the processor 716 for dealing with in-band jamming signals.

Figure 7B:
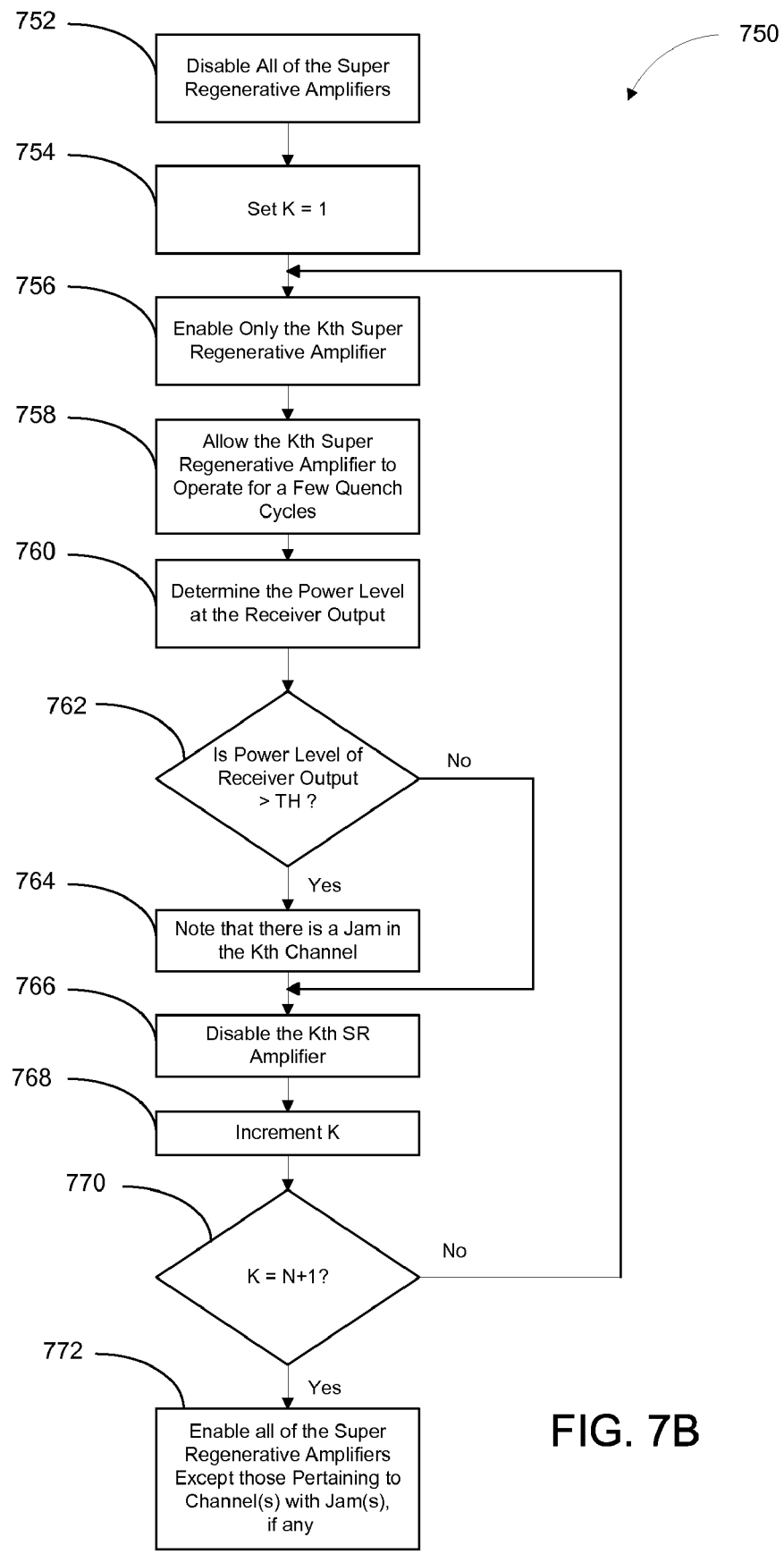
FIG. 7B illustrates a flow diagram of an exemplary method of reducing and/or eliminating in-band jamming signals from the output of the exemplary super regenerative (SR) receiver in accordance with another aspect of the disclosure.

FIG. 7B illustrates a flow diagram of an exemplary method 750 of reducing and/or eliminating in-band jamming signals from the output of the exemplary super regenerative (SR) receiver 700 in accordance with another aspect of the disclosure. It is presumed that at the time of the method 750, the corresponding communications device including the SR receiver 700 is not in communication with another device. Thus, during the operation of the method 750, substantially no intended in-band signals are being received by the SR receiver 700.

According to the method 750, the processor 716 disables the SR amplifiers 702-1 through 702-N (block 752). The processor 716 may perform the disabling of the SR amplifiers 702-1 through 702-N by sending the appropriate disabling signals thereto respectively via the En-1 through En-N. The processor 716 then sets an index K to 1 (block 754). The index K identifies the SR amplifier 702-K which will be currently checked to determine whether it is amplifying an in-band jamming signal. The processor 716 then enables the Kth SR amplifier (block 756). The processor 716 may perform the enabling of the Kth SR amplifier by sending the appropriate enabling signal En-K to the SR amplifier 702-K. For example, if K is equal to 1, the processor 716 enables SR amplifier 702-1. As discussed above, the rest of the SR amplifiers 702-2 through 702-N have been disabled.

Then, according to the method 750, the SR amplifier 702-K is allowed to operate for a few quench cycles (block 758). This is to allow the SR amplifier 702-K to sufficiently stabilize for the purposes of monitoring the output of the SR receiver 700 for in-band jamming signals. The processor 716 then determines the power level at the output of the SR receiver 700 (block 760). As discussed above, the processor 716 may determine the output power level by monitoring the signal received from the ADC 722. The processor 716 then determines whether the power level of the receiver output is greater than a defined threshold (block 762). The defined threshold may be related to the power level produced by ambient noise. One method of determining the defined threshold is to disconnect the antenna 710 and connect therefore a 50 Ohm termination. The corresponding value at the output of the ADC 722 may then be used as the defined threshold. Alternatively, the defined threshold may be determined by measuring the ambient temperature with a temperature sensor, and then using a look-up table to map the sensed temperature to the defined threshold. If the processor 716 determines that the power level of the receiver output is greater than the defined threshold, the processor 716 notes that there is a jamming signal in the Kth channel (block 764). The processor 716 then disables the SR amplifier 702-K as specified in block 766.

If the power level at the receiver output is below the defined threshold, the processor 716 skips block 764 and disables the SR amplifier 702-K (block 766). The processor 716 may perform this by sending the appropriate disabling signal En-K to the SR amplifier 702-K. The processor 716 then increments the index K to select the next SR amplifier to undergo the in-band jamming signal check (block 768). The processor 716 then checks whether the index K is equal to N+1 (block 770). If it is, which means that all of the SR amplifiers have been checked for in-band jamming signals, the processor 716 then enables all of the SR amplifiers, except those identified in block 764 as having an in-band jamming signal (block 772). If, in block 770, the index K does not equal to N+1, the processor 716 then returns to block 756 to perform the in-band jamming signal check for the next SR amplifier. Thus, according to the method 750, any SR amplifier that amplifies an in-band jamming signal is disabled in order to prevent the in-band jamming signal from propagating to the output of the SR receiver 700. If the number N of SR amplifiers is chosen to be relatively large, the effects on the overall frequency response due to a small number of SR amplifiers being disabled should be small.

Figure 8:
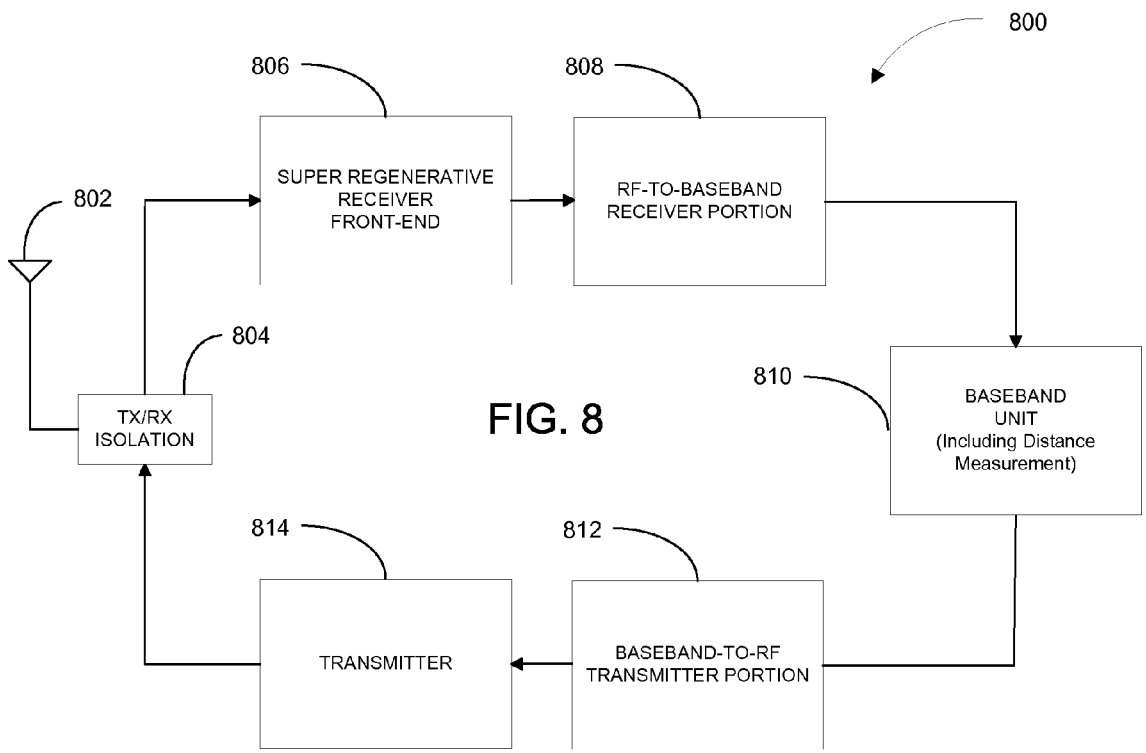
FIG. 8 illustrates a block and schematic diagram of an exemplary communications device in accordance with another aspect of the disclosure.

FIG. 8 illustrates a block diagram of an exemplary communications device 800 that includes an SR receiver front-end in accordance with another aspect of the disclosure. The communications device 800 comprises an antenna 802, a transmitter/receiver (Tx/Rx) isolation device 804, an SR receiver front-end 806, an RF-to-baseband receiver portion 808, a baseband unit 810, a baseband-to-RF transmitter portion 812, and a transmitter 814. The antenna 802 serves to receive signals from other communications devices via a wireless medium, and to send signals to other communications devices via the wireless medium. The Tx/Rx isolation device 804 serves to isolate the input of the SR receiver front-end 806 from the relatively large power of the signal generated by the transmitter 814 during transmission of signals to other communications device.

As discussed above, the SR receiver front-end 806 receives and amplifies signals received from other communications devices. The RF-to-baseband receiver portion 808 converts the received signal from RF to baseband for further processing by the baseband unit 810. The RF-to-baseband receiver portion 808 may be configured as a non-coherent receiver, such as an energy-detection receiver. The baseband unit 810 processes the baseband signal to ascertain the information carried therein. The baseband unit 810 may be configured to at least partially determine the distance to a remote communications device, as previously discussed. The baseband-to-RF transmitter portion 812 converts outgoing signals generated by the baseband unit 810 into RF for transmission via the wireless medium. The transmitter 814 conditions the outgoing signal (e.g., by power amplifying, pulse modulating, etc.) for transmission of the outgoing signals to other communications devices via the wireless medium.

Although not shown, the receiver 806 and/or 808 may be controlled by a pulse modulating device in order to establish a receiving communications channel (e.g., an ultra-wide band (UWB) communications channel) using pulse division multiple access (PDMA), pulse division multiplexing (PDM), or other type of pulse modulation. Although not shown, the transmitter 812 and/or 814 may be controlled by a pulse modulating device to enable signal transmission at particular instances defined by pulses in order to establish a transmitting communications channel (e.g., an ultra-wide band (UWB) communications channel) using PDMA, PDM, or other type of pulse modulation. The transmitting and receiving channels may be established concurrently, although the channels may be orthogonal so as not to interfere with each other. Using pulse modulation techniques to enable and disable the transmitter and receiver, improved power efficiency may be achieved for the communications device 800. For example, during times when the transmitter is not transmitting and the receiver is not receiving, these devices may be operated in low or no power mode to conserve power, such as power provided by a battery.

Figure 9A:
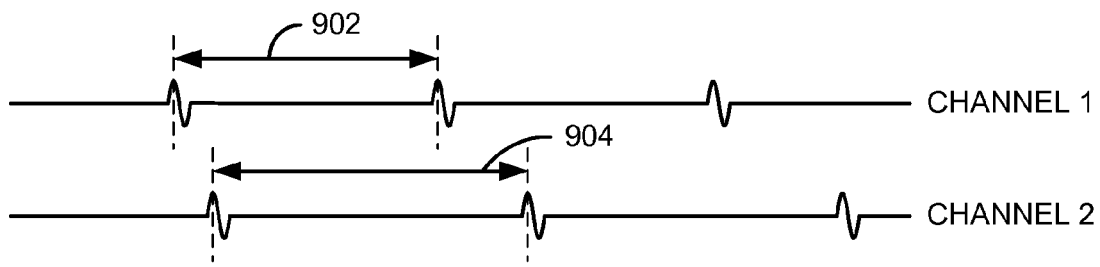
FIGS. 9A-D illustrate timing diagrams of various pulse modulation techniques in accordance with another aspect of the disclosure.

FIG. 9A illustrates different channels (channels 1 and 2) defined with different pulse repetition frequencies (PRF) as an example of a PDMA modulation. Specifically, pulses for channel 1 have a pulse repetition frequency (PRF) corresponding to a pulse-to-pulse delay period 902. Conversely, pulses for channel 2 have a pulse repetition frequency (PRF) corresponding to a pulse-to-pulse delay period 904. This technique may thus be used to define pseudo-orthogonal channels with a relatively low likelihood of pulse collisions between the two channels. In particular, a low likelihood of pulse collisions may be achieved through the use of a low duty cycle for the pulses. For example, through appropriate selection of the pulse repetition frequencies (PRF), substantially all pulses for a given channel may be transmitted at different times than pulses for any other channel.

The pulse repetition frequency (PRF) defined for a given channel may depend on the data rate or rates supported by that channel. For example, a channel supporting very low data rates (e.g., on the order of a few kilobits per second or Kbps) may employ a corresponding low pulse repetition frequency (PRF). Conversely, a channel supporting relatively high data rates (e.g., on the order of a several megabits per second or Mbps) may employ a correspondingly higher pulse repetition frequency (PRF).

Figure 9B:
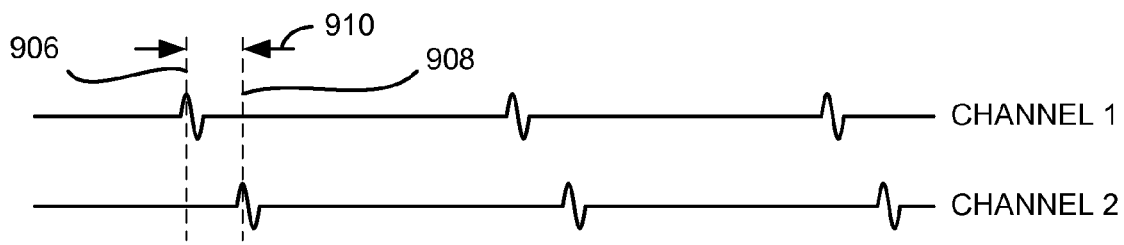

FIG. 9B illustrates different channels (channels 1 and 2) defined with different pulse positions or offsets as an example of a PDMA modulation. Pulses for channel 1 are generated at a point in time as represented by line 906 in accordance with a first pulse offset (e.g., with respect to a given point in time, not shown). Conversely, pulses for channel 2 are generated at a point in time as represented by line 908 in accordance with a second pulse offset. Given the pulse offset difference between the pulses (as represented by the arrows 910), this technique may be used to reduce the likelihood of pulse collisions between the two channels. Depending on any other signaling parameters that are defined for the channels (e.g., as discussed herein) and the precision of the timing between the devices (e.g., relative clock drift), the use of different pulse offsets may be used to provide orthogonal or pseudo-orthogonal channels.

Figure 9C:
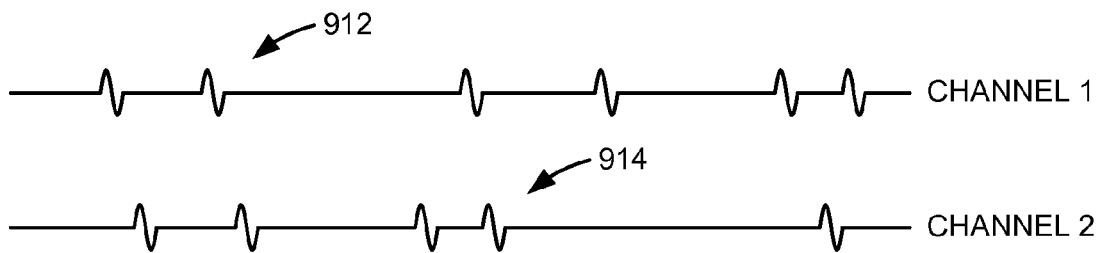

FIG. 9C illustrates different channels (channels 1 and 2) defined with different timing hopping sequences. For example, pulses 912 for channel 1 may be generated at times in accordance with one time hopping sequence while pulses 914 for channel 2 may be generated at times in accordance with another time hopping sequence. Depending on the specific sequences used and the precision of the timing between the devices, this technique may be used to provide orthogonal or pseudo-orthogonal channels. For example, the time hopped pulse positions may not be periodic to reduce the possibility of repeat pulse collisions from neighboring channels.

Figure 9D:
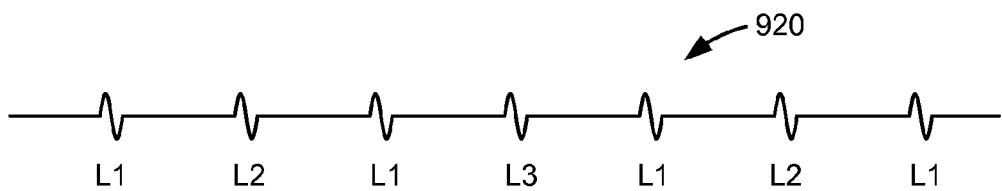

FIG. 9D illustrates different channels defined with different time slots as an example of a PDM modulation. Pulses for channel L1 are generated at particular time instances. Similarly, pulses for channel L2 are generated at other time instances. In the same manner, pulse for channel L3 are generated at still other time instances. Generally, the time instances pertaining to the different channels do not coincide or may be orthogonal to reduce or eliminate interference between the various channels.

It should be appreciated that other techniques may be used to define channels in accordance with a pulse modulation schemes. For example, a channel may be defined based on different spreading pseudo-random number sequences, or some other suitable parameter or parameters. Moreover, a channel may be defined based on a combination of two or more parameters.

Figure 10:
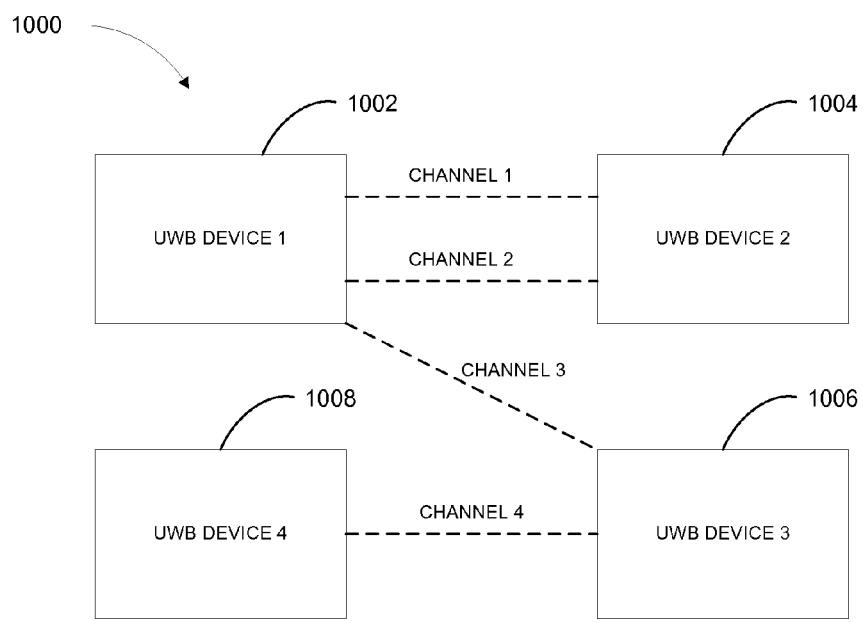
FIG. 10 illustrates a block diagram of various communications devices communicating with each other via various channels in accordance with another aspect of the disclosure.

FIG. 10 illustrates a block diagram of various ultra-wide band (UWB) communications devices communicating with each other via various channels in accordance with another aspect of the disclosure. For example, UWB device 1 1002 is communicating with UWB device 2 1004 via two concurrent UWB channels 1 and 2. UWB device 1002 is communicating with UWB device 3 1006 via a single channel 3. And, UWB device 3 1006 is, in turn, communicating with UWB device 4 1008 via a single channel 4. Other configurations are possible. The communications devices may be used for many different applications, and may be implemented, for example, in a headset, microphone, biometric sensor, heart rate monitor, pedometer, EKG device, watch, remote control, switch, tire pressure monitor, or other communications devices.

Figure 11:
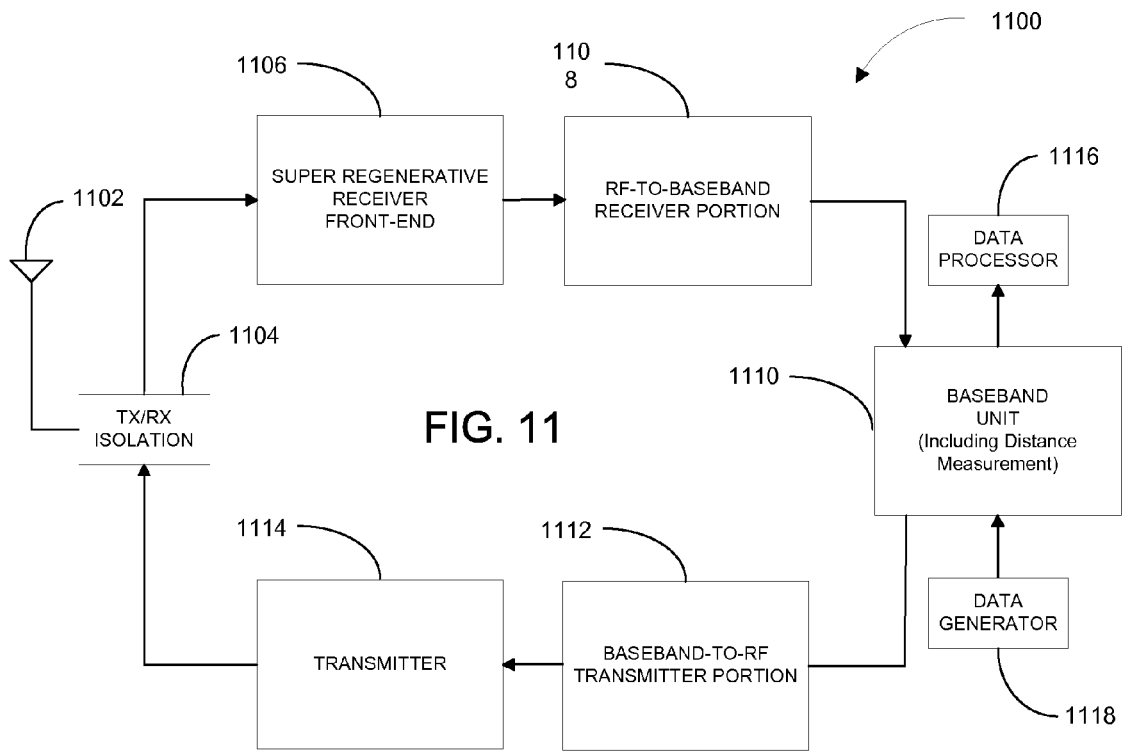
FIG. 11 illustrates a block diagram of an exemplary communications device including an exemplary transceiver in accordance with another aspect of the disclosure.

FIG. 11 illustrates a block diagram of an exemplary communications device 1100 including an exemplary transceiver in accordance with another aspect of the disclosure. The communications device 1100 may be particularly suited for sending and receiving data to and from other communications devices. The communications device 1100 comprises an antenna 1 102, a Tx/Rx isolation device 1 104, an SR receiver front-end 1106, an RF-to-baseband receiver portion 1108, a baseband unit 1110, a baseband-to-RF transmitter portion 1112, a transmitter 1114, a data processor 1116, and a data generator 1118.

In operation, the data processor 1116 may receive data from other communications device via the antenna 1102 which picks up the RF signal from the other communications device, the Tx/Rx isolation device 1104 which sends the signal to the SR receiver front-end 1106, the SR receiver front-end 1106 which amplifies the received signal, the RF-to-baseband receiver portion 1108 which converts the RF signal into a baseband signal, and the baseband unit 1110 which processes the baseband signal to determine the received data. The baseband unit 1110 may be configured to at least partially determine the distance to a remote communications device, as previously discussed. The data processor 1116 then performs one or more defined operations based on the received data. For example, the data processor 1116 may include a microprocessor, a microcontroller, a reduced instruction set computer (RISC) processor, a display, an audio device including a transducer such as speakers, a medical device, a robotic or mechanical device responsive to the data, etc.

Further, in operation, the data generator 1118 may generate outgoing data for transmission to another communications device via the baseband unit 1110 which processes the outgoing data into a baseband signal for transmission, the baseband-to-RF transmitter portion 1112 converts the baseband signal into an RF signal, the transmitter 1114 conditions the RF signal for transmission via the wireless medium, the Tx/Rx isolation device 1104 which routes the RF signal to the antenna 1102 while isolating the input to the SR receiver front-end 1106, and the antenna 1102 which radiates the RF signal to the wireless medium. The data generator 1118 may be a sensor or other type of data generator. For example, the data generator 1118 may include a microprocessor, a microcontroller, a RISC processor, a keyboard, a pointing device such as a mouse or a track ball, an audio device including a transducer such as a microphone, a medical device, a robotic or mechanical device that generates data, etc.

Figure 12:
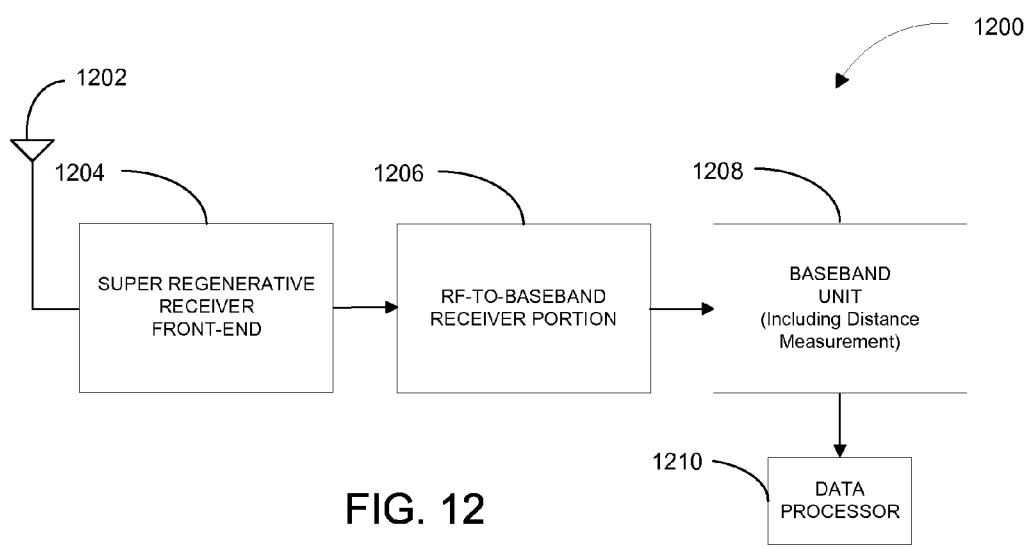
FIG. 12 illustrates a block diagram of an exemplary communications device including an exemplary receiver in accordance with another aspect of the disclosure.

FIG. 12 illustrates a block diagram of an exemplary communications device 1200 including an exemplary receiver in accordance with another aspect of the disclosure. The communications device 1200 may be particularly suited for receiving data from other communications devices. The communications device 1200 comprises an antenna 1202, an SR receiver front-end 1204, an RF-to-baseband receiver portion 1206, a baseband unit 1208, and a data processor 1210.

In operation, the data processor 1210 may receive data from other communications device via the antenna 1202 which picks up the RF signal from the other communications device, the SR receiver front-end 1204 which amplifies the received signal, the RF-to-baseband receiver portion 1206 which converts the RF signal into a baseband signal, and the baseband unit 1208 which processes the baseband signal to determine the received data. The baseband unit 1208 may be configured to at least partially determine the distance to a remote communications device, as previously discussed. The data processor 1210 then performs one or more defined operations based on the received data. For example, the data processor 1210 may include a microprocessor, a microcontroller, a RISC processor, a display, an audio device including a transducer, such as speakers, a medical device, a robotic or mechanical device responsive to the data, etc.

Figure 13:
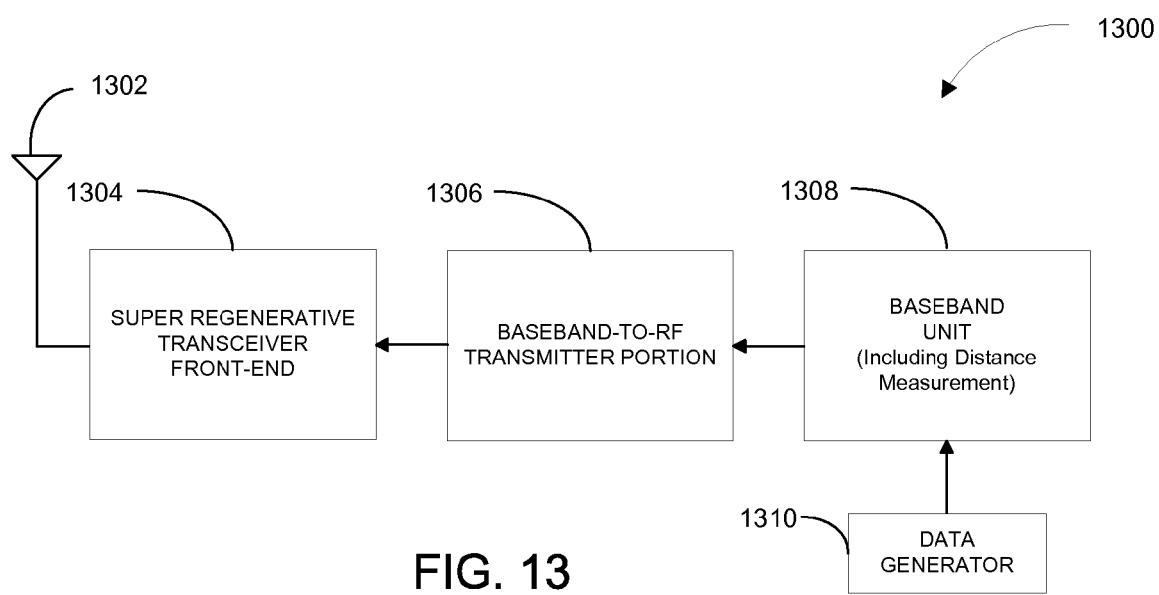
FIG. 13 illustrates a block diagram of an exemplary communications device including an exemplary transceiver in accordance with another aspect of the disclosure.

FIG. 13 illustrates a block diagram of an exemplary communications device 1300 including an exemplary transceiver in accordance with another aspect of the disclosure. The communications device 1300 may be particularly suited for sending data to other communications devices. The communications device 1300 comprises an antenna 1302, an SR transceiver front-end 1304, a baseband-to-RF transmitter portion 1306, a baseband unit 1308, and a data generator 1310.

In operation, the data generator 1310 may generate outgoing data for transmission to another communications device via the baseband unit 1308 which processes the outgoing data into a baseband signal for transmission, the baseband-to-RF transmitter portion 1306 which converts the baseband signal into an RF signal, the transceiver 1304 which conditions the RF signal for transmission via the wireless medium, and the antenna 1302 which radiates the RF signal to the wireless medium. The data generator 1310 may be a sensor or other type of data generator. For example, the data generator 1310 may include a microprocessor, a microcontroller, a RISC processor, a keyboard, a pointing device such as a mouse or a track ball, an audio device including a transducer such as a microphone, a medical device, a robotic or mechanical device that generates data, etc. The baseband unit 1308 may be configured to at least partially determine the distance to a remote communications device, as previously discussed.

Any of the above aspects of the disclosure may be implemented in many different devices. For example, in addition to medical applications as discussed above, the aspects of the disclosure may be applied to health and fitness applications. Additionally, the aspects of the disclosure may be implemented in shoes for different types of applications. There are other multitude of applications that may incorporate any aspect of the disclosure as described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. An apparatus for wireless communications, comprising:
   a super regenerative receiver adapted to receive an incoming signal from a remote apparatus, wherein the super regenerative receiver is tuned to receive the incoming signal within a defined ultra-wide band channel that has a fractional bandwidth on the order of 20% or more, has a bandwidth on the order of 500 MHz or more, or has a fractional bandwidth on the order of 20% or more and has a bandwidth on the order of 500 MHz or more; and
   a first circuit adapted to at least partially determine a distance to the remote apparatus based on the incoming signal.

2. The apparatus of claim 1, wherein the super regenerative receiver comprises one or more super regenerative amplifiers.

3. The apparatus of claim 1, wherein the super regenerative receiver comprises a plurality of super regenerative amplifiers coupled in parallel, and further wherein the super regenerative amplifiers are tuned to respective distinct frequency bands.

4. The apparatus of claim 3, wherein a number (N) of the super regenerative amplifiers, respective quality factors (Q) of the super regenerative amplifiers, and respective center frequencies ($f_c$) of the distinct frequency bands are configured to provide a defined minimum gain, a defined gain ripple, or a defined frequency response across the fractional bandwidth or the bandwidth.

5. The apparatus of claim 3, wherein one or more of the distinct frequency bands overlap with at least another of the one or more distinct frequency bands.

6. The apparatus of claim 1, further comprising a second circuit adapted to determine a substantially line of sight (LOS) portion of the incoming signal, wherein the first circuit is adapted to at least partially determine the distance to the remote apparatus from the substantially LOS portion of the incoming signal.

7. The apparatus of claim 6, wherein the second circuit comprises:
   a power detector adapted to generate a first response related to a power level of the incoming signal;
   a noise level detector adapted to generate a second response related to a power level of an ambient noise; and
   a comparator adapted to generate an output based on a comparison of the first response to the second response.

8. The apparatus of claim 1, wherein the incoming signal comprises one or more pulses.

9. The apparatus of claim 1, wherein the first circuit is adapted to at least partially determine the distance to the remote apparatus based on an approximate time of receiving the incoming signal.

10. The apparatus of claim 1, further comprising:
    a transmitter adapted to transmit an outgoing signal to the remote apparatus,
    wherein the first circuit is adapted to determine the distance to the remote apparatus based on an approximate time of transmitting the outgoing signal to the remote apparatus, and an approximate time of receiving the incoming signal from the remote apparatus.

11. The apparatus of claim 1, further comprising a transmitter adapted to transmit an outgoing signal to the remote apparatus, wherein the first circuit is adapted to process the incoming signal and cause the transmitter to transmit the outgoing signal based on the process of the incoming signal.

12. The apparatus of claim 1, further comprising a second circuit adapted to determine whether a jamming signal is present at an output of the super regenerative receiver.

13. The apparatus of claim 12, further comprising a third circuit adapted to disable a portion of the super regenerative receiver to reduce or eliminate the jamming signal from the output of the super regenerative receiver.

14. The apparatus of claim 1, wherein the super regenerative receiver is quenched at a defined rate, and further wherein the first circuit is adapted to at least partially determine the distance to the remote apparatus with an accuracy that is a function of the speed of light and the defined rate.

15. A method for wireless communications, comprising:
    receiving an incoming signal from a remote apparatus using a super regenerative receiver;
    tuning the super regenerative receiver to receive the incoming signal within a defined ultra-wide band channel that has a fractional bandwidth on the order of 20% or more, has a bandwidth on the order of 500 MHz or more, or has a fractional bandwidth on the order of 20% or more and has a bandwidth on the order of 500 MHz or more; and
    at least partially determining a distance to the remote apparatus based on the incoming signal.

16. The method of claim 15, wherein receiving the incoming signal further comprises receiving the incoming signal with one or more super regenerative amplifiers.

17. The method of claim 15, further comprising:
    coupling a plurality of super regenerative amplifiers of the super regenerative receiver in parallel; and
    tuning the super regenerative amplifiers to respective distinct frequency bands.

18. The method of claim 17, further comprising:
    selecting a number (N) of the super regenerative amplifiers;
    selecting respective quality factors (Q) of the super regenerative amplifiers; and selecting respective center frequencies ($f_c$) of the distinct frequency bands;

wherein N, and the respective Q and $f_c$ are selected to provide a minimum gain, a defined gain ripple or a defined frequency response across the fractional bandwidth or the bandwidth.

19. The method of claim 17, wherein one or more of the distinct frequency bands overlap with at least another of the one or more distinct frequency bands.

20. The method of claim 15, wherein at least partially determining the distance to the remote apparatus comprises:

determining a substantially line of sight (LOS) portion of the incoming signal; and at least partially determining the distance to the remote apparatus from the substantially LOS portion of the incoming signal.

21. The method of claim 20, wherein determining the substantially LOS portion of the incoming signal comprises:

generating a first response related a power level of the incoming signal;

generating a second response related to a power level of ambient noise; and generating an output based on a comparison of the first response to the second response.

22. The method of claim 15, wherein the incoming signal comprises one or more pulses.

23. The method of claim 15, wherein at least partially determining the distance to the remote apparatus comprises determining an approximate time in which the incoming signal was received.

24. The method of claim 15, further comprising:

transmitting an outgoing signal to the remote apparatus; and determining the distance to the remote apparatus based on an approximate time of transmitting the outgoing signal to the remote apparatus, and an approximate time of receiving the incoming signal from the remote apparatus.

25. The method of claim 15, further comprising:

processing the incoming signal; and transmitting an outgoing signal based on the processing of the incoming signal.

26. The method of claim 15, further comprising determining whether a jamming signal is present at an output of the super regenerative receiver.

27. The method of claim 26, further comprising disabling a portion of the super regenerative receiver to reduce or eliminate the jamming signal from the output of the super regenerative receiver.

28. The method of claim 15, further comprising:

quenching the super regenerative receiver at a defined rate; and wherein at least partially determining the distance includes at least partially determining the distance to the remote apparatus with an accuracy that is a function of the speed of light and the defined rate.

29. An apparatus for wireless communications comprising:

means for receiving an incoming signal from a remote apparatus using a super regenerative receiver, wherein the super regenerative receiver is tuned to receive the incoming signal within a defined ultra-wide band channel that has a fractional bandwidth on the order of 20% or more, has a bandwidth on the order of 500 MHz or more, or has a fractional bandwidth on the order of 20% or more and has a bandwidth on the order of 500 MHz or more; and means for at least partially determining the distance to the remote apparatus based on the incoming signal.

30. The apparatus of claim 29, wherein the super regenerative receiver comprises one or more super regenerative amplifiers.

31. The apparatus of claim 29, wherein the super regenerative receiver comprises a plurality of super regenerative amplifiers coupled in parallel, and further wherein the super regenerative amplifiers are tuned to respective distinct frequency bands.

32. The apparatus of claim 31, wherein a number (N) of the super regenerative amplifiers, respective quality factors (Q) of the super regenerative amplifiers, and respective center frequencies ($f_c$) of the distinct frequency bands are configured to provide a defined minimum gain, a defined gain ripple, or a defined frequency response across the fractional bandwidth or the bandwidth.

33. The apparatus of claim 31, wherein one or more of the distinct frequency bands overlap with at least another of the one or more distinct frequency bands.

34. The apparatus of claim 29, wherein the means for at least partially determining the distance comprises means for determining a substantially line of sight (LOS) portion of the incoming signal.

35. The apparatus of claim 34, wherein the means for determining the substantially LOS portion of the incoming signal comprises:

means for generating a first response related a power level of the incoming signal;

means for generating a second response related to a power level of ambient noise; and means for generating an output based on a comparison of the first response to the second response.

36. The apparatus of claim 29, wherein the incoming signal comprises a plurality of pulses.

37. The apparatus of claim 29, wherein means for at least partially determining the distance to the remote apparatus comprises means for determining an approximate time in which the incoming signal was received.

38. The apparatus of claim 29, further comprising:

means for transmitting an outgoing signal to the remote apparatus; and wherein the means for determining the distance to the remote apparatus comprises:

means for determining an approximate time of transmitting the outgoing signal to the remote apparatus; and means for determining an approximate time of receiving the incoming signal from the remote apparatus.

39. The apparatus of claim 29, further comprising:

means for transmitting an outgoing signal to the remote apparatus; and wherein the means for partially determining the distance to the remote apparatus comprises:

means for processing the incoming signal; and means for causing the transmitting means to transmit the outgoing signal based on the processing of the incoming signal.

40. The apparatus of claim 29, further comprising means for determining whether a jamming signal is present at an output of the super regenerative receiver.

41. The apparatus of claim 40, further comprising means for disabling a portion of the super regenerative receiver to reduce or eliminate the jamming signal from the output of the super regenerative receiver.

42. The apparatus of claim 29, wherein the super regenerative receiver is quenched at a defined rate, and further wherein the means for at least partially determining the distance is adapted to at least partially determine the distance to the remote apparatus with an accuracy that is a function of the speed of light and the defined rate.

43. A computer program product for determining a distance to a remote apparatus comprising a non-transitory computer readable medium including codes executable by at least one computer to:
   receive an incoming signal from the remote apparatus using a super regenerative receiver, wherein the super regenerative receiver is tuned to receive the incoming signal within a defined ultra-wide band channel that has a fractional bandwidth on the order of 20% or more, has a bandwidth on the order of 500 MHz or more, or has a fractional bandwidth on the order of 20% or more and has a bandwidth on the order of 500 MHz or more, and
   at least partially determine the distance to the remote apparatus based on the incoming signal.

44. A headset for wireless communications, comprising:
   an antenna;
   a super regenerative receiver adapted to receive an incoming signal and data from a remote apparatus via the antenna, wherein the super regenerative receiver is tuned to receive the incoming signal within a defined ultra-wide band channel that has a fractional bandwidth on the order of 20% or more, has a bandwidth on the order of 500 MHz or more, or has a fractional bandwidth on the order of 20% or more and has a bandwidth on the order of 500 MHz or more;
   a circuit adapted to at least partially determine the distance to the remote apparatus based on the incoming signal; and
   a transducer adapted to generate an audio output from the received data.

45. A watch for wireless communications, comprising:
   an antenna;
   a super regenerative receiver adapted to receive an incoming signal and data from a remote apparatus via the antenna, wherein the super regenerative receiver is tuned to receive the incoming signal within a defined ultra-wide band channel that has a fractional bandwidth on the order of 20% or more, has a bandwidth on the order of 500 MHz or more, or has a fractional bandwidth on the order of 20% or more and has a bandwidth on the order of 500 MHz or more;
   a circuit adapted to at least partially determine the distance to the remote apparatus based on the incoming signal; and
   a display adapted to produce a visual output based on the received data.

46. A sensed device for wireless communications, comprising:
   a super regenerative receiver adapted to receive an incoming signal from a remote apparatus, wherein the super regenerative receiver is tuned to receive the incoming signal within a defined ultra-wide band channel that has a fractional bandwidth on the order of 20% or more, has a bandwidth on the order of 500 MHz or more, or has a fractional bandwidth on the order of 20% or more and has a bandwidth on the order of 500 MHz or more;
   a circuit adapted to at least partially determine the distance to the remote apparatus based on the incoming signal;
   a sensor adapted to generate sensed data; and
   a transmitter adapted to transmit the sensed data to the remote apparatus based on the distance to the remote apparatus.

* * * * *